(12) United States Patent
Singh et al.

(10) Patent No.: US 10,115,487 B2
(45) Date of Patent: *Oct. 30, 2018

(54) SHUTDOWN SYSTEM FOR A NUCLEAR STEAM SUPPLY SYSTEM

(71) Applicant: SMR Inventec, LLC, Marlton, NJ (US)

(72) Inventors: Krishna P. Singh, Hobe Sound, FL (US); Joseph Rajkumar, Marlton, NJ (US)

(73) Assignee: SMR INVENTEC, LLC

( * ) Notice: Subject to any disclaimer, the term of this patent is extended or adjusted under 35 U.S.C. 154(b) by 737 days.

This patent is subject to a terminal disclaimer.

(21) Appl. No.: 14/433,394

(22) PCT Filed: Oct. 4, 2013

(86) PCT No.: PCT/US2013/063405
§ 371 (c)(1),
(2) Date: Apr. 3, 2015

(87) PCT Pub. No.: WO2014/099101
PCT Pub. Date: Jun. 26, 2014

(65) Prior Publication Data
US 2016/0260508 A1 Sep. 8, 2016

Related U.S. Application Data

(63) Continuation-in-part of application No. 14/620,390, filed on Feb. 12, 2015, which is a continuation-in-part (Continued)

(51) Int. Cl.
*G21C 15/18* (2006.01)
*G21D 3/14* (2006.01)
(Continued)

(52) U.S. Cl.
CPC ............ *G21C 15/182* (2013.01); *F22B 1/023* (2013.01); *G21C 1/32* (2013.01); *G21C 15/00* (2013.01);
(Continued)

(58) Field of Classification Search
CPC ............................ G21C 15/18; G21C 15/182; G21C 2015/185; G21D 1/04; G21D 1/006; F22B 1/023; F22B 35/04; F22B 35/004
See application file for complete search history.

(56) References Cited

U.S. PATENT DOCUMENTS 3,575,807 A * 4/1971 Ripley ...................... G21D 1/04
261/118
4,187,146 A * 2/1980 Shen ........................ G21D 3/04
376/298
(Continued)

FOREIGN PATENT DOCUMENTS

GB 949608 2/1964
WO 9954886 10/1999

OTHER PUBLICATIONS

Ito, T. et al. Development of an Advance Startup-Procedure for a Pius-type Reactor. Journal of Nuclear Science and Technology, vol. 35, No. 8., Mar. 15, 2012, pp. 554-563 [Online].
(Continued)

*Primary Examiner* — Sharon M Davis
(74) *Attorney, Agent, or Firm* — The Belles Group, P.C.

(57) ABSTRACT

A nuclear steam supply system having a shutdown system for removing residual decay heat generated by a nuclear fuel core. The steam supply system may utilize gravity-driven primary coolant circulation through hydraulic-ally interconnected reactor and steam generating vessels forming the steam supply system. The shutdown system may comprise primary and secondary coolant systems. The primary coolant cooling system may include a jet pump comprising an
(Continued)

injection nozzle disposed inside the steam generating vessel A portion of the circulating primary coolant is extracted, pressurized and returned to the steam generating vessel to induce coolant circulation under reactor shutdown conditions. The extracted primary coolant may further be cooled before return to the steam generating vessel in some operating modes. The secondary coolant cooling system includes a pumped and cooled flow circuit operating to circulate and cool the secondary coolant, which in tun extracts heat from and cools the primary coolant.

35 Claims, 13 Drawing Sheets

Related U.S. Application Data of application No. PCT/US2013/054961, filed on Aug. 14, 2013.

(60) Provisional application No. 61/709,436, filed on Oct. 4, 2012, provisional application No. 61/683,021, filed on Aug. 14, 2012.

(51) Int. Cl.
  *F22B 1/02* (2006.01)
  *G21C 1/32* (2006.01)
  *G21C 15/00* (2006.01)
  *G21D 1/00* (2006.01)
  *G21D 1/04* (2006.01)

(52) U.S. Cl.
  CPC ............. *G21C 15/18* (2013.01); *G21D 1/006* (2013.01); *G21D 1/04* (2013.01); *G21D 3/14* (2013.01); *Y02E 30/40* (2013.01)

(56) References Cited

U.S. PATENT DOCUMENTS

| | | | | |
|---|---|---|---|---|
| 4,236,970 | A | * | 12/1980 | Harand .................... F22B 1/023 165/158 |
| 4,278,500 | A | * | 7/1981 | Ailloud ................. F22D 11/003 376/241 |
| 4,280,796 | A | * | 7/1981 | Reinsch ................. G21C 15/18 376/282 |
| 4,656,335 | A | | 4/1987 | Durrant et al. |
| 4,699,754 | A | * | 10/1987 | French .................... G21C 15/18 376/281 |
| 5,202,083 | A | | 4/1993 | Spinks et al. |
| 5,343,507 | A | * | 8/1994 | Arnold ................. G21C 15/182 376/203 |
| 5,491,731 | A | | 2/1996 | Corpora et al. |
| 2005/0018806 | A1 | | 1/2005 | Gautier et al. |
| 2009/0129532 | A1 | | 5/2009 | Reyes et al. |
| 2010/0183113 | A1 | | 7/2010 | Ishida et al. |
| 2012/0076254 | A1 | | 3/2012 | Malloy et al. |
| 2013/0272473 | A1 | * | 10/2013 | Koestner ............. G21C 15/182 376/282 |

OTHER PUBLICATIONS

IAEA, Passive Safety Systems and Natural Circulation in Water Cooled Nuclear Power Plants, Nov. 2009 (Nov. 2009).
Corresponding International Search Report and Written Opinion for PCT/US13/63405 dated Jun. 12, 2014.
Corresponding International Search Report and Written Opinion for PCT/US13/54961 dated Jan. 13, 2014.

* cited by examiner

Decay Heat Curve

SHUTDOWN SYSTEM FOR A NUCLEAR STEAM SUPPLY SYSTEM

CROSS-REFERENCE TO RELATED PATENT APPLICATIONS

The present application claims the benefit of PCT International Patent Application No. PCT/US2013/063405 filed Oct. 4, 2013, which claims the benefit of U.S. Provisional Patent Application Ser. No. 61/709,436 filed Oct. 4, 2012, and is a continuation-in-part of PCT International Patent Application No. PCT/US13/54961 filed Aug. 14, 2013, which claims priority to U.S. Provisional Patent Application Ser. No. 61/683,021, filed Aug. 14, 2012; the entireties of which are all incorporated herein by reference.

FIELD OF THE INVENTION

The present invention relates to nuclear steam supply systems, and more particularly to a shutdown system for a nuclear steam supply system usable for cooling primary and secondary coolant.

BACKGROUND OF THE INVENTION

For starting up a nuclear steam supply system in a typical pressurized water reactor (PWR), it is necessary to heat the reactor coolant water to an operating temperature, which is known in the art as the no-load operating temperature of the reactor coolant water. Furthermore, in conventional nuclear steam supply systems it is necessary to ensure full flow through the coolant loop and the core. This is necessary to ensure that a completely turbulated flow across the fuel core exists as the control rods are being withdrawn in order to avoid localized heating and boiling, and to ensure that the reactivity of water is in the optimal range during start-up and during normal operation.

In the present state of the art, the desired start-up condition is achieved by the use of the reactor coolant pump whose primary function is to circulate coolant through the reactor core during normal operating conditions. In normal operation, the substantial frictional heat produced by the reactor coolant pumps is removed by external cooling equipment (heat exchangers) to maintain safe operating temperature. However, during start-up external cooling is disabled so that the frictional heat can be directly transferred to the reactor coolant water, enabling it to reach no-load operating temperature. As the reactor coolant water is being heated, the pressure in the reactor coolant loop is increased using a bank of internal heaters which evaporates some reactor coolant water and increases the pressure in the reactor coolant system by maintaining a two-phase equilibrium.

The above process for heating the reactor water inventory during start-up is not available in a passively safe nuclear steam supply system. This is because such a passively safe nuclear steam supply system does not include or require any pumps, and thus the use of the frictional heat is unavailable for heating the reactor water inventory. Thus, a need exists for a start-up system for heating the reactor water inventory in a passively safe nuclear steam supply system.

According to another aspect of PWRs, it is desirable to provide a shutdown system for a nuclear steam supply system to cool primary and secondary coolant in order to bring the reactor from a hot full power state to a cold and shutdown state in a safe and controlled manner which protects the reactor and steam supply system from potential damage associated thermal and/or pressure transients.

SUMMARY OF THE INVENTION

The present disclosure provides an improved shutdown system for a nuclear steam supply system. The shutdown system may include a primary coolant cooling system and a secondary coolant cooling systems. Both cooling systems may be operated in tandem and cooperation to cool the primary coolant, which in turn removes and rejects residual decay heat produced by the nuclear fuel core during reactor shutdown conditions. In one embodiment, as further described herein, the primary and secondary coolant cooling systems may be operated in sequential stages or phases to gradually and safely bring the reactor from a hot full power state to a cold and shutdown state.

In one embodiment, a nuclear steam supply system with shutdown cooling system includes: a reactor vessel having an internal cavity; a reactor core comprising nuclear fuel disposed within the internal cavity and operable to heat a primary coolant; a steam generating vessel fluidly coupled to the reactor vessel; a riser pipe positioned within the steam generating vessel and fluidly coupled to the reactor vessel; a primary coolant loop formed within the reactor vessel and the steam generating vessel, the primary coolant loop being configured for circulating primary coolant through the reactor vessel and steam generating vessel; and a primary coolant cooling system. The primary coolant system includes: an intake conduit having an inlet fluidly coupled to the primary coolant loop; a pump fluidly coupled to the intake conduit, the pump configured and operable to extract and pressurize primary coolant from the primary coolant loop and discharge the pressurized primary coolant through an injection conduit; a Venturi injection nozzle having an inlet fluidly coupled to the injection conduit and positioned within the riser pipe to inject pressurized primary coolant into the riser pipe from the pump; and a heat exchanger configured and operable to cool the extracted primary coolant.

In another embodiment, a nuclear steam supply system with shutdown cooling system includes: a reactor vessel having an internal cavity; a reactor core comprising nuclear fuel disposed within the internal cavity and operable to heat a primary coolant; a steam generating vessel fluidly coupled to the reactor vessel and containing a secondary coolant for producing steam to operate a steam turbine, the steam generating vessel including a superheater section and a steam generator section; a riser pipe positioned inside the steam generating vessel and fluidly coupled to the reactor vessel; a primary coolant flow loop formed within the reactor vessel and the steam generating vessel, the primary coolant flow loop being configured and operable for circulating primary coolant through the reactor vessel and steam generating vessel; a primary coolant cooling system; and a secondary coolant cooling system. The primary coolant cooling system includes: a first pump having an inlet fluidly coupled to the primary coolant flow loop, the first pump configured and operable to extract and pressurize a portion of the primary coolant from the primary coolant loop; a Venturi injection nozzle having an inlet fluidly coupled to a discharge of the first pump and positioned inside the riser pipe in the steam generating vessel, the injection nozzle receiving and injecting the pressurized portion of the primary coolant into the riser pipe from the pump; and a first heat exchanger configured and operable to cool the extracted primary coolant prior to injecting the pressurized portion of the primary coolant. The secondary coolant cooling system includes: a steam bypass condenser having an inlet fluidly coupled to the superheater section of the steam generator vessel for receiving and cooling secondary coolant in a steam phase; a second heat exchanger having an inlet fluidly coupled to the steam generator section of the steam generating vessel for receiving and cooling secondary coolant in a liquid phase; and a second pump having an inlet fluidly coupled to the steam bypass condenser and the second heat exchanger, the second pump configured and operable to pressurize and circulate secondary coolant through the steam generator in a secondary coolant flow loop. The secondary coolant cooling system is configured to cool secondary coolant in either the steam or liquid phase.

In another embodiment, a nuclear steam supply system with shutdown cooling system includes: a reactor vessel having an internal cavity; a vertically elongated reactor core comprising nuclear fuel disposed within the internal cavity and operable to heat a primary coolant; a vertically elongated steam generating vessel fluidly coupled to the reactor vessel and containing a secondary coolant for producing steam to operate a steam turbine, the steam generating vessel including a superheater section and a steam generator section; a vertically elongated riser pipe positioned inside the steam generating vessel and fluidly coupled to the reactor vessel; a primary coolant flow loop formed within the reactor vessel and the steam generating vessel, the primary coolant flow loop being configured and operable for circulating primary coolant through the reactor vessel and steam generating vessel; a secondary coolant flow loop formed outside of the reactor vessel and steam generating vessel, the secondary coolant flow loop being configured and operable for circulating secondary coolant through the steam generating vessel; and a Venturi jet pump disposed inside the riser pipe of the steam generating vessel, the jet pump including an injection nozzle fluidly coupled to the primary coolant flow loop. The jet pump receives and injects a portion of the primary coolant into the riser pipe which draws and mixes primary coolant from the reactor vessel with the injected portion of the primary coolant in the riser pump to circulate primary coolant through the primary coolant flow loop.

A method for removing residual decay heat from a nuclear reactor fuel core under shutdown conditions is provided. The method includes: providing a steam generating vessel hydraulically coupled to a reactor vessel housing a nuclear fuel core; circulating a primary coolant through a primary coolant flow loop formed inside and between the steam generating vessel and reactor vessel; extracting a portion of the primary coolant from the primary coolant flow loop; pressurizing the extracted portion of the primary coolant; injecting the extracted portion of the primary coolant into a riser pipe disposed inside the steam generating vessel through a Venturi injection nozzle; and drawing primary coolant from the reactor vessel into the riser pipe using the injection nozzle. In one embodiment, the method further includes cooling the extracted portion of the primary coolant prior to injecting the extracted portion of the primary coolant into the riser pipe. In one embodiment, the cooling step is performed using a first tubular heat exchanger. The tubular heat exchanger may be a dual purpose heat exchanger configured for either cooling the primary coolant during steam supply system shutdown or heating the primary coolant during steam supply system startup.

The present invention further provides an improved nuclear steam supply system and start-up sub-system therefor that overcomes the deficiencies of the foregoing existing arrangements. The present invention also provides an improved method of heating a primary coolant in a nuclear steam supply system to a no load operating temperature.

In one aspect, the invention can be a nuclear steam supply system comprising: a reactor vessel having an internal cavity, a reactor core comprising nuclear fuel disposed within the internal cavity; a steam generating vessel fluidly coupled to the reactor vessel; a riser pipe positioned within the steam generating vessel and fluidly coupled to the reactor vessel; a primary coolant at least partially filling a primary coolant loop formed within the reactor vessel and the steam generating vessel; and a start-up sub-system comprising: an intake conduit having an inlet located in the primary coolant loop; a pump fluidly coupled to the intake conduit for pumping a portion of the primary coolant from the primary coolant loop through the intake conduit and into an injection conduit: at least one heating element for heating the portion of the primary coolant to form a heated portion of the primary coolant; and an injection nozzle fluidly coupled to the injection conduit and positioned within the riser pipe for injecting the heated portion of the primary coolant into the riser pipe.

In another aspect, the invention can be a nuclear steam supply system comprising: a reactor vessel having an internal cavity, a reactor core comprising nuclear fuel disposed within the internal cavity; a steam generating vessel fluidly coupled to the reactor vessel; a primary coolant loop formed within the reactor vessel and the steam generating vessel, a primary coolant in the primary coolant loop; and a start-up sub-system fluidly coupled to the primary coolant loop, the start-up sub-system configured to: (1) receive a portion of the primary coolant from the primary coolant loop; (2) heat the portion of the primary coolant to form a heated portion of the primary coolant; and (3) inject the heated portion of the primary coolant into the primary coolant loop.

In yet another aspect, the invention can be a method of heating a primary coolant to a no-load operating temperature in a nuclear steam supply system, the method comprising: a) filling a primary coolant loop within a reactor vessel and a steam generating vessel that are fluidly coupled together with a primary coolant; b) drawing a portion of the primary coolant from the primary coolant loop and into a start-up sub-system; c) heating the portion of the primary coolant within the start-up sub-system to form a heated portion of the primary coolant; and d) injecting the heated portion of the primary coolant into the primary coolant loop.

In a further aspect, the invention can be a method of starting up a nuclear steam supply system, the method comprising: a) at least partially filling a primary coolant loop within a reactor vessel and a steam generating vessel that are fluidly coupled together with a primary coolant, wherein the primary coolant loop comprises a riser pipe in the steam generating vessel; b) drawing a portion of the primary coolant from the primary coolant loop and into a start-up sub-system; c) heating the portion of the primary coolant within the start-up sub-system to form a heated portion of the primary coolant; and d) introducing the heated portion of the primary coolant into the riser pipe of the steam generating vessel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments of the present invention will be described with reference to the following drawings, where like elements are labeled similarly, and in which.

Figure 1:
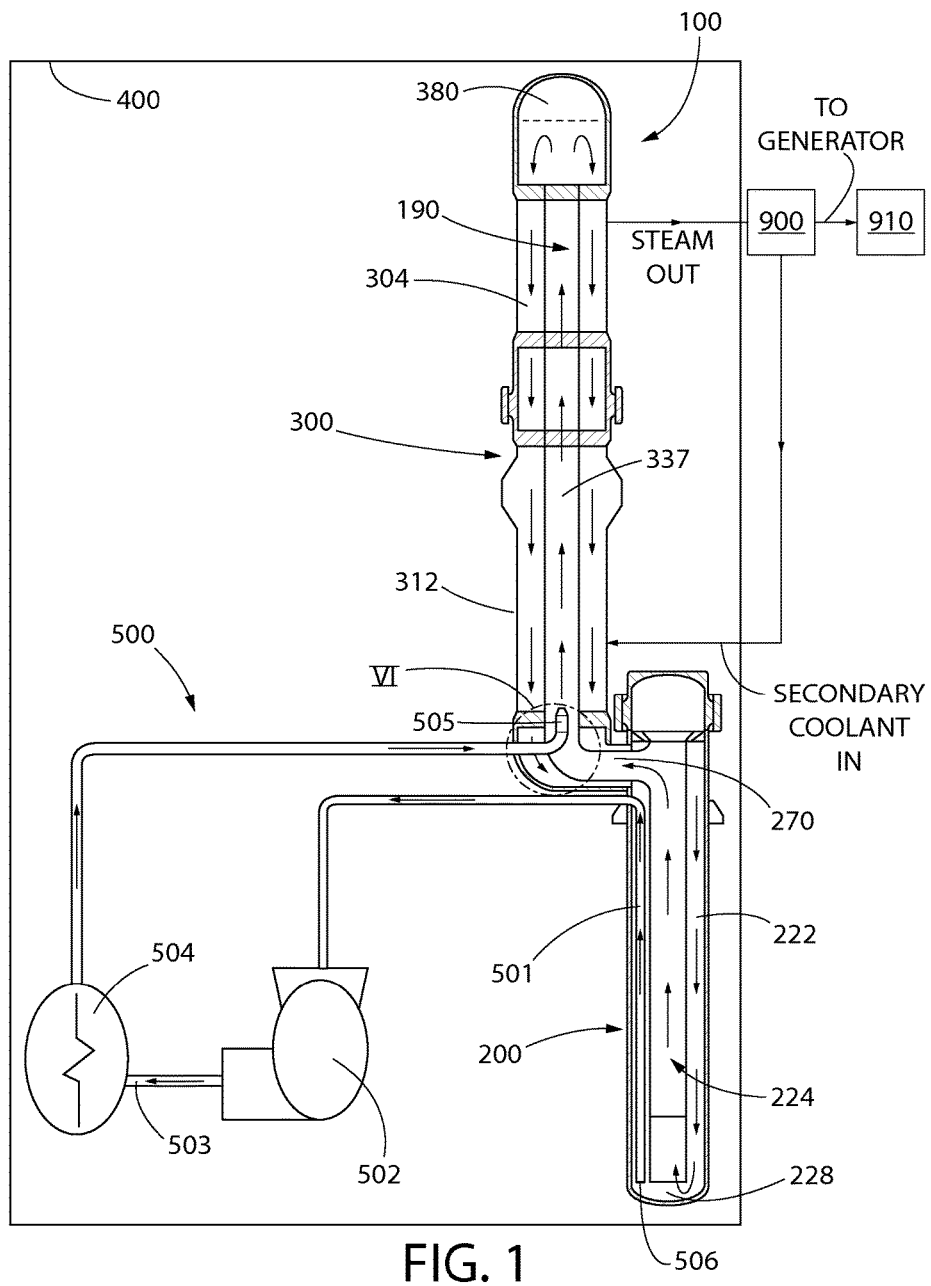
FIG. 1 is front view of a nuclear steam supply system including a reactor vessel, a steam generating vessel and a start-up sub-system in accordance with an embodiment of the present invention.

All drawings are schematic and not necessarily to scale.

DETAILED DESCRIPTION OF THE INVENTION

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

Referring first to FIG. 1, a nuclear steam supply system 100 is illustrated in accordance with an embodiment of the present invention. Although described herein as being a nuclear steam supply system, in certain embodiments the system may be generally referred to herein as a steam supply system. The inventive nuclear steam supply system 100 is typically used in a nuclear pressurized water reactor and generally comprises a reactor vessel 200, a steam generating vessel 300 and a start-up sub-system 500. Of course, the nuclear steam supply system 100 can have uses other than for nuclear pressurized water reactors as can be appreciated.

During normal operation of the nuclear steam supply system 100, a primary coolant flows through a primary coolant loop 190 within the reactor vessel 200 and the steam generating vessel 300. This primary coolant loop 190 is depicted with arrows in FIG. 1. Specifically, the primary coolant flows upwardly through a riser column 224 in the reactor vessel 200, from the reactor vessel 200 to the steam generating vessel 300 through a fluid coupling 270, upwardly through a riser pipe 337 in the steam generating vessel 300 to a top of the steam generating vessel 300 (i.e., to a pressurizer 380), and then downwardly through tubes 332 (see FIGS. 3 and 4) in a tube side 304 of the steam generating vessel 300, from the steam generating vessel 300 to the reactor vessel 200 through the fluid coupling 270, downwardly through a downcomer 222 of the reactor vessel 200, and then back from the downcomer 222 of the reactor vessel 200 to the riser column 224 of the reactor vessel 200. The primary coolant continues to flow along this primary coolant loop 190 as desired without the use of any pumps during normal operation of the nuclear steam supply system 100.

It should be appreciated that in certain embodiments the primary coolant loop 190 is filled or partially filled with the primary coolant when the nuclear steam supply system 100 is shut down and not operating. By filled it may mean that the entire primary coolant loop 190 is completely filled with the primary coolant, or that the primary coolant loop 190 is almost entirely filled with the primary coolant with some room for air which leaves space for the addition of more primary coolant if desired or the expansion of the primary coolant as it heats up during the start-up procedures discussed below. In certain embodiments, before start-up the primary coolant is static in the primary coolant loop 190 in that there is no flow of the primary coolant along the primary coolant loop. However, during a start-up procedure utilizing the start-up sub-system 500 discussed in detail below, the primary coolant is heated and caused to flow through the primary coolant loop 190 and eventually is able to flow through the primary coolant loop 190 passively and unaided by any pumps due to the physics concept of thermosiphon flow.

Before nuclear fuel within the reactor core engages in a fission chain reaction to produce heat, a start-up process using the start-up sub-system 500 takes place to heat the primary coolant to a no-load operating temperature, as discussed in more detail below. During normal operation of the nuclear steam supply system 100, the primary coolant has an extremely high temperature due to its flowing through the reactor core. Specifically, nuclear fuel in the reactor vessel 200 engages in the fission chain reaction, which produces heat and heats the primary coolant as the primary coolant flows through the reactor core of the reactor vessel 200. This heated primary coolant is used to phase-change a secondary coolant from a liquid into steam as discussed below.

While the primary coolant is flowing through the primary coolant loop 190 during normal operation, the secondary coolant is flowing through a second coolant loop. Specifically, the secondary coolant is introduced into the shell side 305 (FIGS. 3 and 4) of the steam generating vessel 300 at the secondary coolant in location indicated in FIG. 1. The secondary coolant then flows through the shell side 305 (FIGS. 3 and 4) of the steam generating vessel 300 where it is heated by heat transfer from the primary coolant. The secondary coolant is converted into steam due to the heat transfer, and the steam flows from the steam generating vessel 300 to a turbine 900 as indicated in FIG. 1. The turbine 900 drives an electric generator 910 which is connected to the electrical grid for power distribution. The steam then travels from the turbine 900 to a condenser (not illustrated) whereby the steam is cooled down and condensed to form condensate. Thus, the condenser converts the steam back to a liquid condensate (i.e., the secondary coolant) so that it can be pumped back into the steam generator 300 at the secondary coolant inlet location and repeat its flow through the flow path discussed above and be converted back to steam.

In certain embodiments both the primary coolant and the secondary coolant may be water, such as demineralized water. However, the invention is not to be so limited and other liquids or fluids can be used in certain other embodiments, the invention not being limited to the material of the primary and secondary coolants unless so claimed.

The primary coolant continues to flow through the primary coolant loop and the secondary coolant continues to flow in the second coolant loop during normal operation of the nuclear steam supply system 100. The general provision and operation of the gravity-driven nuclear steam supply system 100 and details of the associated components is described in detail in International Application No. PCT/US13/38289, filed on Apr. 25, 2013, the entirety of which is incorporated herein by reference.

Referring to FIGS. 1-4, the general details of the components and the operation of the nuclear steam supply system 100, and specifically of the reactor vessel 200 and the steam generating vessel 300, will be described. In the exemplified embodiment, the reactor vessel 200 and the steam generating vessel 300 are vertically elongated and separate components which hydraulically are closely coupled, but are discrete vessels in themselves that are thermally isolated except for the exchange of primary coolant (i.e. reactor coolant) flowing between the vessels in the fluid coupling 270 of the primary coolant loop 190 as discussed above. In one non-limiting embodiment, each of the reactor vessel 200 and the steam generating vessel 300 may be made of a corrosion resistant metal such as stainless steel, although other materials of construction are possible.

Figure 2:
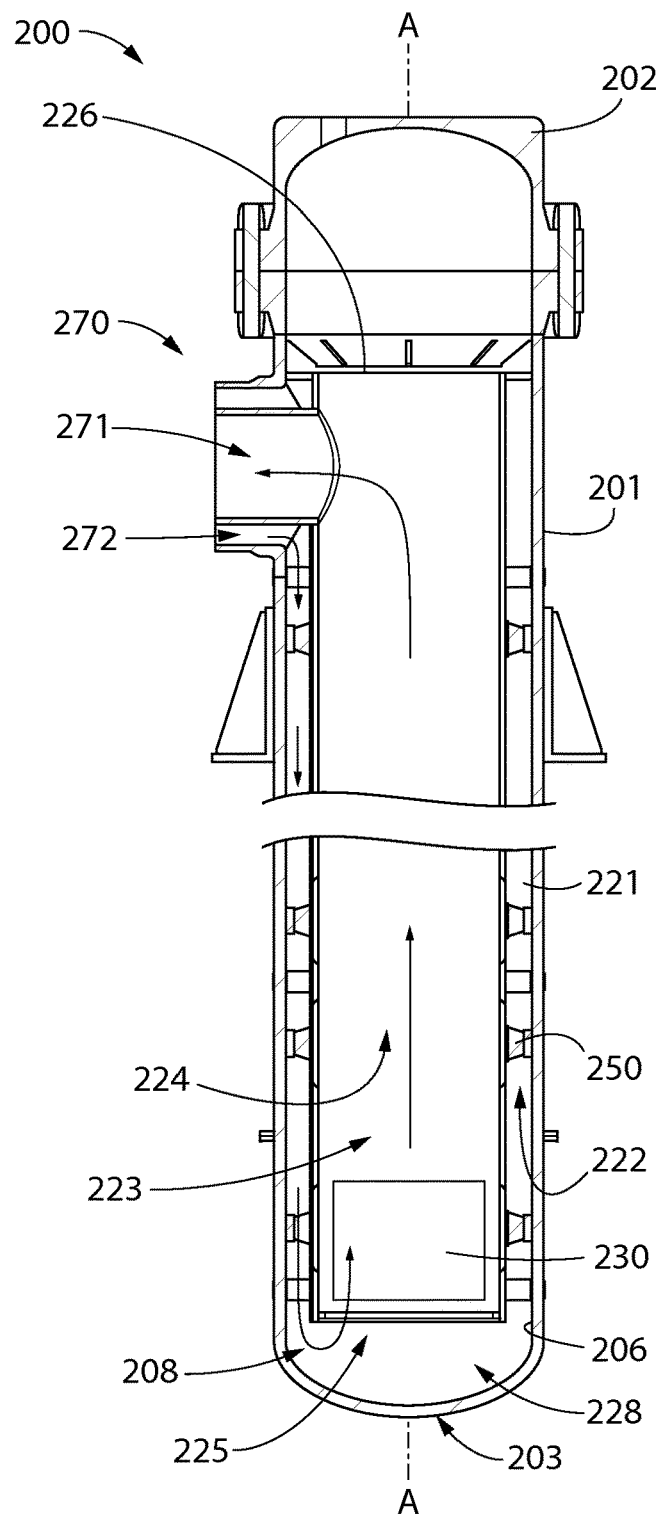
FIG. 2 is an elevation cross-sectional view of the reactor vessel of FIG. 1.

Referring to FIGS. 1 and 2 concurrently, the reactor vessel 200 will be further described. The reactor vessel 200 in one non-limiting embodiment is an ASME code Section III, Class I thick-walled cylindrical pressure vessel comprised of a cylindrical sidewall shell 201 with an integrally welded hemispherical bottom head 203 and a removable hemispherical top head 202. The shell 201 defines an internal cavity 208 configured for holding the reactor core which comprises the nuclear fuel. Specifically, the reactor vessel 200 includes a cylindrical reactor shroud 220 which contains the reactor core defined by a fuel cartridge 230 (i.e., nuclear fuel). The reactor shroud 220 transversely divides the shell portion of the reactor vessel into two concentrically arranged spaces: (1) an outer annulus 221 defining the annular downcomer 222 for primary coolant entering the reactor vessel which is formed between the outer surface of the reactor shroud 220 and an inner surface 206 of the shell 201; and (2) a passageway 223 defining the riser column 224 for the primary coolant leaving the reactor vessel 200 heated by fission in the reactor core.

The reactor shroud 220 is elongated and extends in an axial direction along a vertical axis A-A of the reactor vessel 200. The reactor shroud 220 includes an open bottom end 225 and a closed top end 226. In one embodiment, the open bottom end 225 of the reactor shroud 220 is vertically spaced apart by a distance from the bottom head 203 of the reactor vessel 200 thereby forming a bottom flow plenum 228 between the bottom end 225 of the reactor shroud 220 and the bottom head 203 of the reactor vessel 200. As will be discussed in more detail below, during flow of the primary coolant through the primary coolant loop 190, the bottom flow plenum 228 collects the primary coolant from the annular downcomer 222 and directs the primary coolant flow into the inlet of the riser column 224 formed by the open bottom end 225 of the reactor shroud 220.

In certain embodiments, the reactor shroud 220 is a double-walled cylinder which may be made of a corrosion resistant material, such as without limitation stainless steel. This double-wall construction of the reactor shroud 220 forms an insulated structure designed to retard the flow of heat across it and forms a smooth vertical riser column 224 for upward flow of the primary coolant heated by the fission in the fuel cartridge 230 ("core"), which is preferably located at the bottom extremity of the shroud 220 in one embodiment as shown in FIG. 2. The vertical space above the fuel cartridge 230 in the reactor shroud 220 may also contain interconnected control rod segments along with a set of "non-segmental baffles" that serve to protect them from flow induced vibration during reactor operations. The reactor shroud 220 is laterally supported by the reactor vessel by support members 250 to prevent damage from mechanical vibrations that may induce failure from metal fatigue.

In certain embodiments, the fuel cartridge 230 is a unitary autonomous structure containing upright fuel assemblies, and is situated in a region of the reactor vessel 200 that is spaced above the bottom head 203 so that a relatively deep plenum of water lies underneath the fuel cartridge 230. The fuel cartridge 230 is insulated by the reactor shroud 220 so that a majority of the heat generated by the fission reaction in the nuclear fuel core is used in heating the primary coolant flowing through the fuel cartridge 230 and adjoining upper portions of the riser column 224. In certain embodiments, the fuel cartridge 230 is an open cylindrical structure including cylindrically shaped sidewalls, an open top, and an open bottom to allow the primary coolant to flow upward completely through the cartridge (see directional flow arrows, described in detail above with specific reference to FIG. 1). In one embodiment, the sidewalls of the fuel cartridge 230 may be formed by multiple arcuate segments of reflectors which are joined together by suitable means. The open interior of the fuel cartridge 230 may be filled with a support grid for holding the nuclear fuel rods and for insertion of control rods into the core to control the fission reaction as needed.

In the interconnecting space between the reactor vessel 200 and the steam generating vessel 300 there is a fluid coupling 270 that comprises an inner flow path 271 and an outer flow path 272 that concentrically surrounds the inner flow path 271. As will be discussed in more detail below, during flow of the primary coolant the primary coolant flows upwardly within the riser column 224 and through the inner flow path 271 of the fluid coupling 270 to flow from the reactor vessel 200 to the steam generating vessel 300. After the primary coolant gets to the top of the steam generating vessel 300, the primary coolant begins a downward flow through the steam generating vessel 300 and then flows through the outer flow path 272 from the steam generating vessel 300 and into the downcomer 222 of the reactor vessel 200. Again, this flow path will be described in more detail below.

Figure 3:
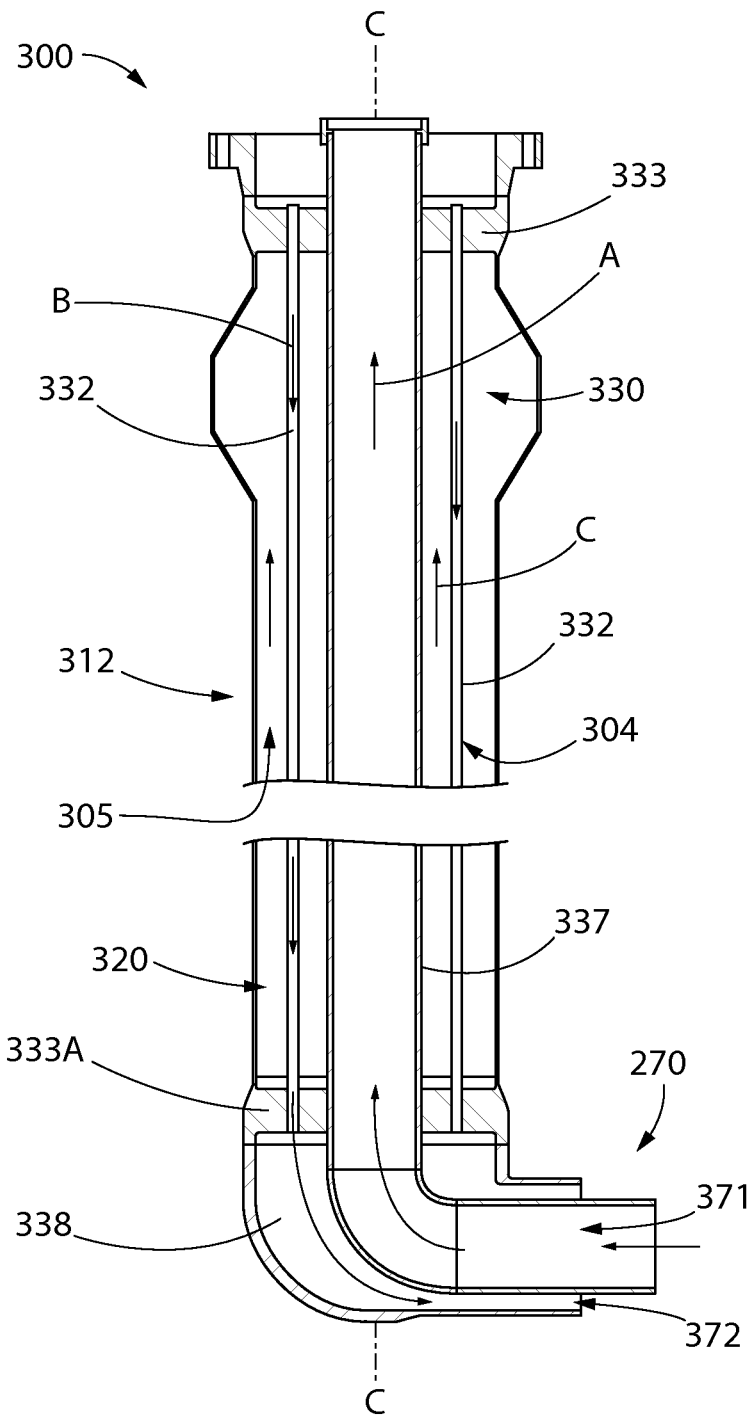
FIG. 3 is an elevation cross-sectional view of the bottom portion of the steam generating vessel of FIG. 1.
Figure 4:
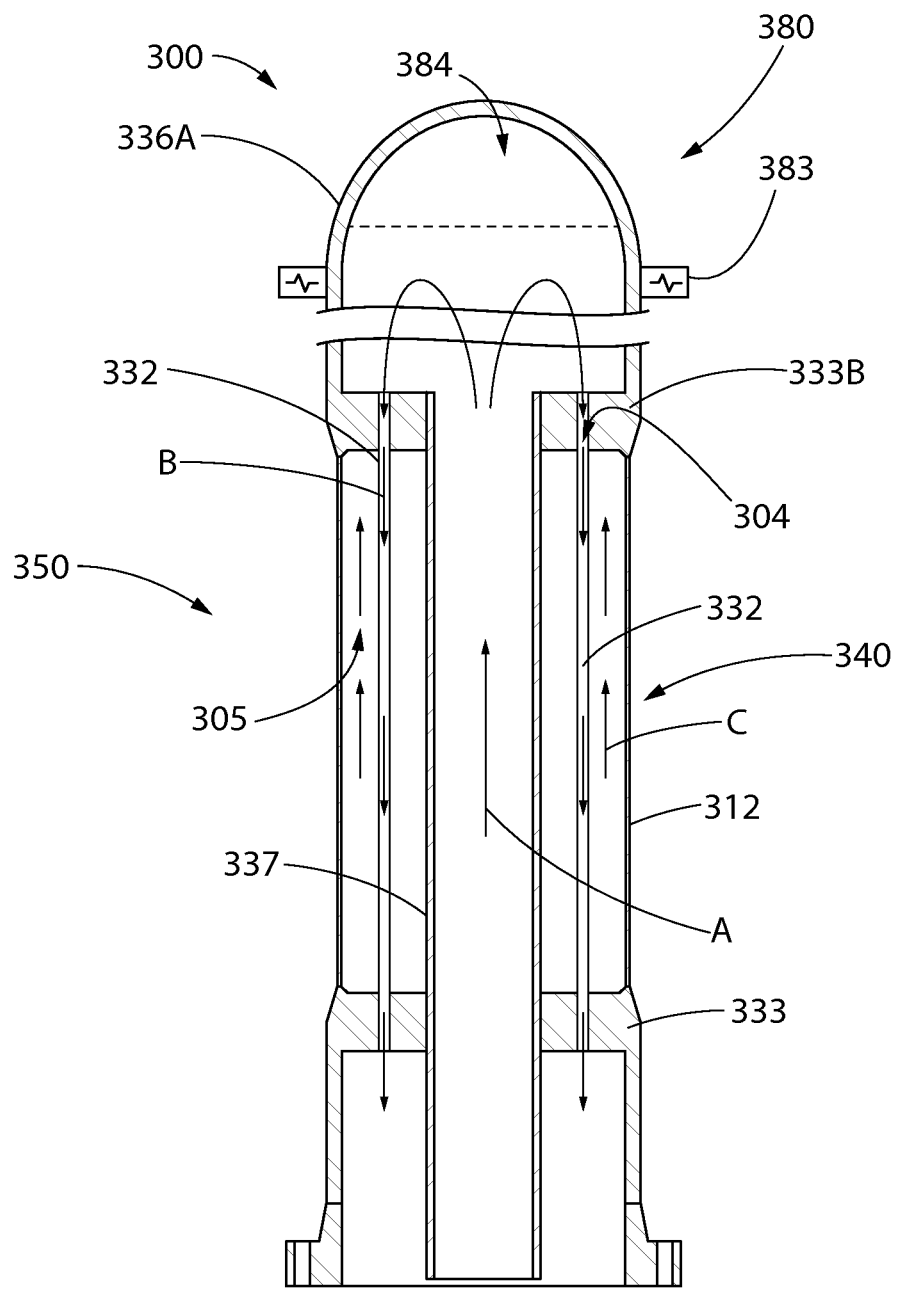
FIG. 4 is an elevation cross-sectional view of the top portion of the steam generating vessel of FIG. 1.

Turning now to FIGS. 1, 3 and 4 concurrently, the details of the steam generating vessel 300 will be described in more detail. In certain embodiments, the steam generating vessel 300 includes a preheater section 320, a steam generator section 330, a superheater section 340 and a pressurizer 380. However, the invention is not to be so limited and one or more of the sections of the steam generating vessel 300 may be omitted in certain other embodiments. Specifically, in certain embodiments the preheater section 320 may be omitted, or may itself be considered a part of the steam generator section 330. A steam bypass loop 303 may be provided (see, e.g. FIG. 9) to route saturated steam from the steam generator section 330 to the superheater section 340 around the intermediate tubesheet structure as shown. As discussed above, it is within the steam generator vessel 300 that the secondary coolant that is flowing through the shell side 305 of the steam generator vessel 300 is converted from a liquid (i.e., secondary coolant inlet illustrated in FIG. 1) to a superheated steam that is sent to the turbine 900 (FIG. 1) for electricity generation via generator 910. The secondary coolant flows in the second coolant loop through the shell side of the steam generating vessel 300, out to the turbine 900, from the turbine 900 to a condenser, and then back into the shell side of the steam generating vessel 300.

In the exemplified embodiment, each of the preheater 320, the steam generator 330, and the superheater 350 are tubular heat exchangers having a tube side 304 and a shell side 305. The tube side 304 of the tubular heat exchangers include a tube bundle comprising a plurality of parallel straight tubes 332 and tubesheets 333 disposed at the extremities or ends of each tube bundle that support the tubes. In the exemplified embodiment, only two tubes 332 are illustrated to avoid clutter. However, in actual use tens, hundreds or thousands of tubes 332 can be positioned within each of the sections of the steam generating vessel 300. In certain embodiments, a bottom-most one of the tubesheets 333A is located in the preheater section 320 or in the steam generator section 330. This bottom-most tubesheet 333A will be discussed in more detail below with regard to a location of injection from the start-up sub-system 500 in one exemplified embodiment.

As noted above, in one embodiment the preheater section 320 can be considered as a part of the steam generator section 330. In such embodiments the steam generator section 330 and the superheater section 350 can be considered as stacked heat exchangers such that the superheater section 350 is disposed above the steam generator section 330. In certain embodiments, the preheater section 320, steam generator section 330, and superheater section 350 are positioned to form a parallel counter-flow type heat exchanger arrangement in which the secondary coolant (Rankine cycle) flows in an opposite, but parallel direction to the primary coolant (see FIGS. 3 and 4). Specifically, the arrows labeled A indicate the flow direction of the primary coolant through the riser pipe 337 that is positioned within the steam generating vessel 300, the arrows labeled B indicate the flow direction of the primary coolant through the tubes 332 of the steam generating vessel 300, and the arrows labeled C indicate the flow direction of the secondary coolant through the shell side 305 of the steam generating vessel 300. The trio of the foregoing tubular heat exchangers (i.e. preheater, steam generator, and superheater) are hydraulically connected in series on both the tube side 304 (primary coolant) and the shell side 305 (the secondary coolant forming the working fluid of the Rankine Cycle which changes phase from liquid to superheated gas).

In the exemplified embodiment, the steam generating vessel 300 includes a top 310, a bottom 311, an axially extending cylindrical shell 312, and the internal riser pipe 337 which is concentrically aligned with the shell 312 and in the exemplified embodiment lies on a centerline C-C of the steam generating vessel 300. The tubes 332 are circumferentially arranged around the outside of the riser pipe 337 between the riser pipe 337 and the shell 312 in sections of the steam generating vessel 300 which include the preheater 320, the steam generator 330, and the superheater 350. In one embodiment, the riser pipe 337 extends completely through all of the tubesheets 333 associated with the preheater 320, the steam generator 330, and the superheater 350 from the top of the steam generating vessel 300 to the bottom to form a part of the continuous primary coolant loop 190 between the reactor vessel 200 and the steam generating vessel 300 all the way to the pressurizer 380.

The fluid coupling 270 includes an inner flowpath 371 and an outer flowpath 372 on the steam generating vessel 300 side of the fluid coupling 270. The inner flowpath 371 is fluidly coupled to the inner flow path 271 and the outer flowpath 372 is fluidly coupled to the outer flowpath 272. Thus, via these operable couplings the steam generating vessel 300 is fluidly coupled to the reactor vessel 200 to complete the primary coolant loop 190 for flow of the primary coolant through both the reactor vessel 200 and the steam generating vessel 300. An annular space is formed between the riser pipe 337 and the shell 312, which forms a bottom plenum 338. The bottom plenum 338 collects and channels the primary coolant from the steam generating vessel 300 back to the reactor vessel 200 via the outer flow paths 272, 372. Thus, in the exemplified embodiment the primary coolant flows from the reactor vessel 200 to the steam generating vessel 300 through the inner flow paths 271, 371 and the primary coolant flows from the steam generating vessel 300 to the reactor vessel 200 through the outer flow paths 272, 372. However, the invention is not to be so limited and in other embodiments the use of the flow paths 271, 272, 371, 372 can be reversed The superheater 350 is topped by a pressurizer 380 as shown in FIGS. 1 and 4, which is in fluid communication with both the top or outlet of the riser pipe 337 and the inlet to the tubes 332 of the superheater 350. In one embodiment, the pressurizer 380 is mounted directly to the shell 312 of the steam generating vessel 300 and forms a top head 336a on the shell. In one embodiment, the pressurizer has a domed or hemispherical head and may be welded to the shell 312, or alternatively bolted in other possible embodiments. The pressurizer 380 forms an upper plenum which collects reactor primary coolant rising through riser pipe 337 and distributes the primary coolant from the riser pipe 337 to the superheater tubes 332. In certain embodiments, the pressurizer 380 includes a heating/quenching element 38. (i.e. water/steam) for pressure control of the reactor primary coolant.

Shown schematically in FIG. 4, the heating/quenching element 383 is comprised of a bank of electric heaters which are installed in the pressurizer section that serve to increase the pressure by boiling some of the primary coolant and creating a steam bubble that resides at the top of the pressurizer near the head (above the liquid/gas interface 340 represented by the dashed line). A water spray column 384 is located near the top head 336a of the pressurizer 380 which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 380 and the heating/quenching element 383 may be without limitation about 2,250 psi. In alternative embodiments, as noted above, the liquid/gas interface 340 is formed between an inert gas, such as nitrogen (N2) supplied by supply tanks (not shown) connected to the pressurizer 380, and the liquid primary coolant.

In one embodiment, the external surfaces of the tubes 332 may include integral fins to compensate for the reduced heat transfer rates in the gaseous superheated steam media. The superheater tube bundle is protected from erosion (i.e. by tiny water droplets that may remain entrained in the up-flowing steam) by ensuring that the steam flow is counter-flow being parallel along, rather than across, the tubes 332 in the tube bundle.

Figure 5A:
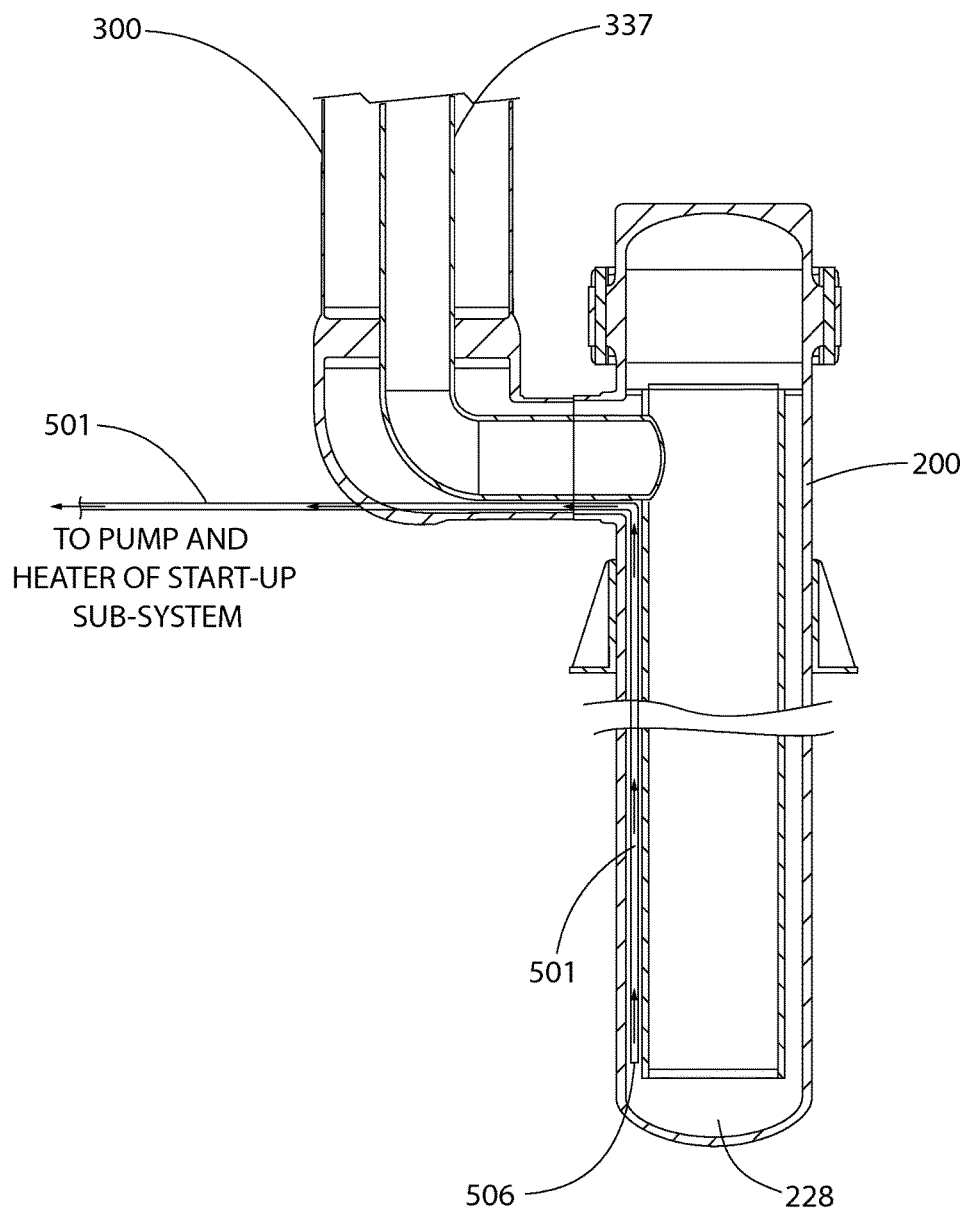
FIG. 5A is a close-up view of the reactor vessel and a portion of the steam generating vessel of FIG. 1 illustrating the location of an intake conduit of the start-up sub-system in accordance with a first embodiment of the present invention.

Referring now to FIGS. 1 and 5A, the start-up sub-system 500 of the nuclear steam supply system 100 will be described in accordance with one embodiment of the present invention. In addition to discussing the components of the start-up sub-system 500 below, the operation of the start-up sub-system 500 in conjunction with the operation of the nuclear steam supply system 100 as a whole will be discussed below. Prior to the start-up processes taking place as will be discussed in more detail below, the primary coolant loop 190 is filled with the primary coolant, but the primary coolant is at ambient temperature and is not flowing through the primary coolant loop 190. Utilizing the start-up sub-system 500 of the present invention, the primary coolant is heated, made to flow through the primary coolant loop 190, and then able to continue passively flowing through the primary coolant loop 190 without the use of any pumps after disconnecting the start-up sub-system 500 from the primary coolant loop 190.

In order to start up the nuclear steam supply system 100 and begin withdrawing the control rods to initiate a fission chain reaction by the nuclear fuel in the reactor vessel 200, the primary coolant should be heated to a no load operating temperature, which in certain embodiments can be between 500° F. and 700° F., more specifically between 550° F. and 650° F., and more specifically approximately 600° F. Ensuring that the primary coolant is at the no load operating temperature before normal operation (i.e., before flowing the steam to the turbine and before withdrawing the control rods) is beneficial for several reasons. First, it ensures that the primary coolant has a completely turbulated flow across the fuel core while the control rods are being withdrawn, which avoids localized heating and boiling. Second, it ensures that the reactivity of the water is in the optimal range during start-up and normal operation. Because the nuclear steam supply system 100 does not utilize any pumps to flow the primary fluid through the primary coolant loop 190 during normal operation but rather relies on thermosiphon flow as discussed above, conventional means of using frictional heat from the pumps to heat up the primary coolant is unavailable. Thus, the inventive nuclear steam supply system 100 uses the start-up sub-system 500 to heat the primary coolant up to the no load operating temperature during start up procedures.

The start-up sub-system 500 is designed to have a high margin of safety. The start-up sub-system 500 also ensures a fully turbulent flow across the fuel core in the reactor vessel 200 and heats the water to no-load operating temperature prior to any withdrawal of the control rods. As discussed in detail above, during start-up of the nuclear steam supply system 100, the primary coolant is located within the primary coolant loop 190 in the reactor vessel 200 and in the steam generating vessel 300, but it does not flow through the primary coolant loop 190 initially. While the primary fluid is positioned in the primary coolant loop 190, the start-up sub-system 500 draws or receives a portion of the primary coolant from the primary coolant loop 190, heats up the portion of the primary coolant to form a heated portion of the primary coolant, and injects the heated portion of the primary coolant back into the primary coolant loop 190. Thus, the start-up sub-system 500 forms a fluid flow circuit that withdraws some of the primary coolant from the primary coolant loop 190 and heats the primary coolant prior to re-injecting that portion of the primary coolant into the primary coolant loop 190.

When the start-up sub-system 500 injects the heated portion of the primary coolant into the primary coolant loop 190, this initiates a venturi effect that creates fluid flow of the entire body of the primary coolant within the primary coolant loop 190. Specifically, the injected heated portion of the primary coolant flows within the primary coolant loop and pulls the initially static primary coolant within the primary coolant loop 190 with it as it flows, thereby creating an entire turbulent flow of the primary coolant (including the original static primary coolant and the heated portion of the primary coolant) through the primary coolant loop 190. Furthermore, because the primary coolant injected from the start-up sub-system is heated relative to the temperature of the primary coolant within the primary coolant loop 190, this injection begins to heat up the primary coolant inventory within the primary coolant loop 190. When the primary coolant within the primary coolant loop 190 reaches the no-load operating temperature, the start-up sub-system 500 can be fluidly disconnected from the reactor vessel 200 and the steam generating vessel 300 and flow of the primary coolant through the primary coolant loop 190 will continue due to thermosiphon properties.

In the exemplified embodiment, the start-up sub-system 500 comprises an intake conduit 501, a pump 502, an injection conduit 503, a heating element 504 and a Venturi flow effect injection nozzle 505 (also alternatively referred to herein as Venturi nozzle 505). The intake conduit 501, the pump 502, the injection conduit 503 and the injection nozzle 505 are all fluidly coupled together so that a portion of the primary coolant that is received by the start-up sub-system 500 will flow through each of the intake conduit 501, the pump 502, the injection conduit 503 and the injection nozzle 505. The intake conduit 501 is fluidly coupled to the suction of the pump 502 and the discharge or injection conduit 503 is fluidly coupled to the discharge of the pump 502.

In the exemplified embodiment, the entire nuclear steam supply system 100 including the reactor vessel 200, the steam generating vessel 300 and the start-up sub-system 500 are housed within a containment vessel 400. This ensures that in the event of a loss-of-coolant accident during start-up, all of the high energy fluids are contained within the containment boundary of the containment vessel 400. The details of the containment vessel 400 can be found in PCT/US13/42070, filed on May 21, 2013, the entirety of which is incorporated herein by reference. Furthermore, the start-up sub-system 500 is at least partially positioned external to the reactor vessel 200 and to the steam generating vessel 300. Specifically, in the exemplified embodiment while the intake conduit 501 is at least partially positioned within one of the reactor vessel 200 or the steam generating vessel 300 to draw a portion of the primary coolant into the start-up sub-system 500 and the injection nozzle 505 is at least partially positioned within one of the reactor vessel 200 or the steam generating vessel 300 to inject the heated portion of the primary coolant back into one of the reactor vessel 200 or the steam generating vessel 300, the pump 502 and the heating element 504 are positioned entirety external to the reactor vessel 200 and to the steam generating vessel 300.

The portion of the primary coolant that is introduced into the start-up sub-system 500 flows in a single direction through the start-up sub-system 500 from the intake conduit 501 to the injection nozzle 505. The intake conduit 501 and the injection conduit 503 can be a single pipe or conduit or can be multiple pipes or conduits that are fluidly coupled together. In some embodiments, the intake conduit 501 and the injection conduit 503 comprise heavy wall pipes that are sized to be between five and seven inches in diameter, and more specifically approximately six inches in diameter. Furthermore, the injection nozzle 505 has a smaller diameter than the diameter of the intake conduit 501 and the injection conduit 503, and can be between two and four inches, or approximately three inches. However, the invention is not to be so limited and the sizing of the intake conduit 501, the injection conduit 503 and the injection nozzle 505 can be greater than or less than the noted ranges in other embodiments.

In the exemplified embodiment, the pump 502 may be a centrifugal pump designed to pump a sufficiently large flow of the primary coolant to develop turbulent conditions in the reactor core. Specifically, in certain embodiments the pump 502 can pump approximately 10% of the normal flow through the primary coolant loop 190 and is able to overcome any pressure differential through the riser pipe 337. Of course, the invention is not to be so limited and the pump 502 can be any type of pump and can pump any amount of the primary coolant through the start-up sub-system 500 as desired or needed for start-up procedures to be successful. In one embodiment, the pump preferably may have a flow capacity of less than 100% of the normal flow through the primary coolant loop 190 because flow in the primary coolant system may be a gravity driven as opposed to a pumped coolant flow system and is intended to be used for reactor start-up or shut-down operation only, not during normal reactor operating conditions.

The heating element 504 can be any mechanism or apparatus that is capable of transferring heat into the portion of the primary coolant that is flowing through the start-up sub-system 500. The heating element 504 can be a single heater or a bank of heaters. The heating element can take on any form, including being a resistance wire, molybdenum disilicide, etched foil, a heat lamp, PTC ceramic, a heat exchanger or any other element that can provide heat to a liquid that is flowing through a conduit. In certain embodiments, the heating element 504 can be powered by electrically powered resistance rods. In other embodiments, the heating element 504 can be powered by and may be tubular heat exchanger(s) supplied with steam by an auxiliary steam boiler. In this design, heating element 504 may be a shell and tube heat exchanger having auxiliary steam flowing through the shell side and primary reactor coolant flowing through the tube side of the heat exchanger. Any mechanism can be used as the heating element 504 so long as the heating element 504 can transfer heat into the primary coolant in order to heat up the portion of the primary coolant that is flowing through the start-up sub-system 500.

In the exemplified embodiment, the intake conduit 501 comprises an inlet 506 that is located within the primary coolant loop 190. More specifically, in the embodiment of FIG. 1 the inlet 506 of the intake conduit 501 is positioned at a bottom of the reactor vessel 200. This may include positioning the inlet 506 of the intake conduit 501 within the bottom flow plenum 228 of the reactor vessel 200. However, the invention is not to be so limited and the bottom of the reactor vessel 200 may include positioning the inlet 506 of the intake conduit 501 adjacent to the bottom end 225 of the shroud 220. Furthermore, in other embodiments the inlet 506 of the intake conduit 501 can be located in a central vertical region of the reactor vessel 200 or in a top vertical region of the reactor vessel 200 or within the steam generating vessel 300 as discussed in more detail below with reference to FIGS. 5A-5C. Positioning the inlet 506 of the intake conduit 501 at the bottom of the reactor vessel 200 ensures that the portion of the primary coolant that is removed from the primary coolant loop and received by the start-up sub-system 500 is the coolest or coldest primary coolant available in the primary coolant loop. Such positioning of the inlet 506 of the intake conduit 501 can reduce start-up time. However, the invention is not to be limited by positioning the inlet 506 of the intake conduit 501 at the bottom of the reactor vessel 200, and other positions are possible as discussed above and again below with regard to FIGS. 5A-5C.

Figure 5B:
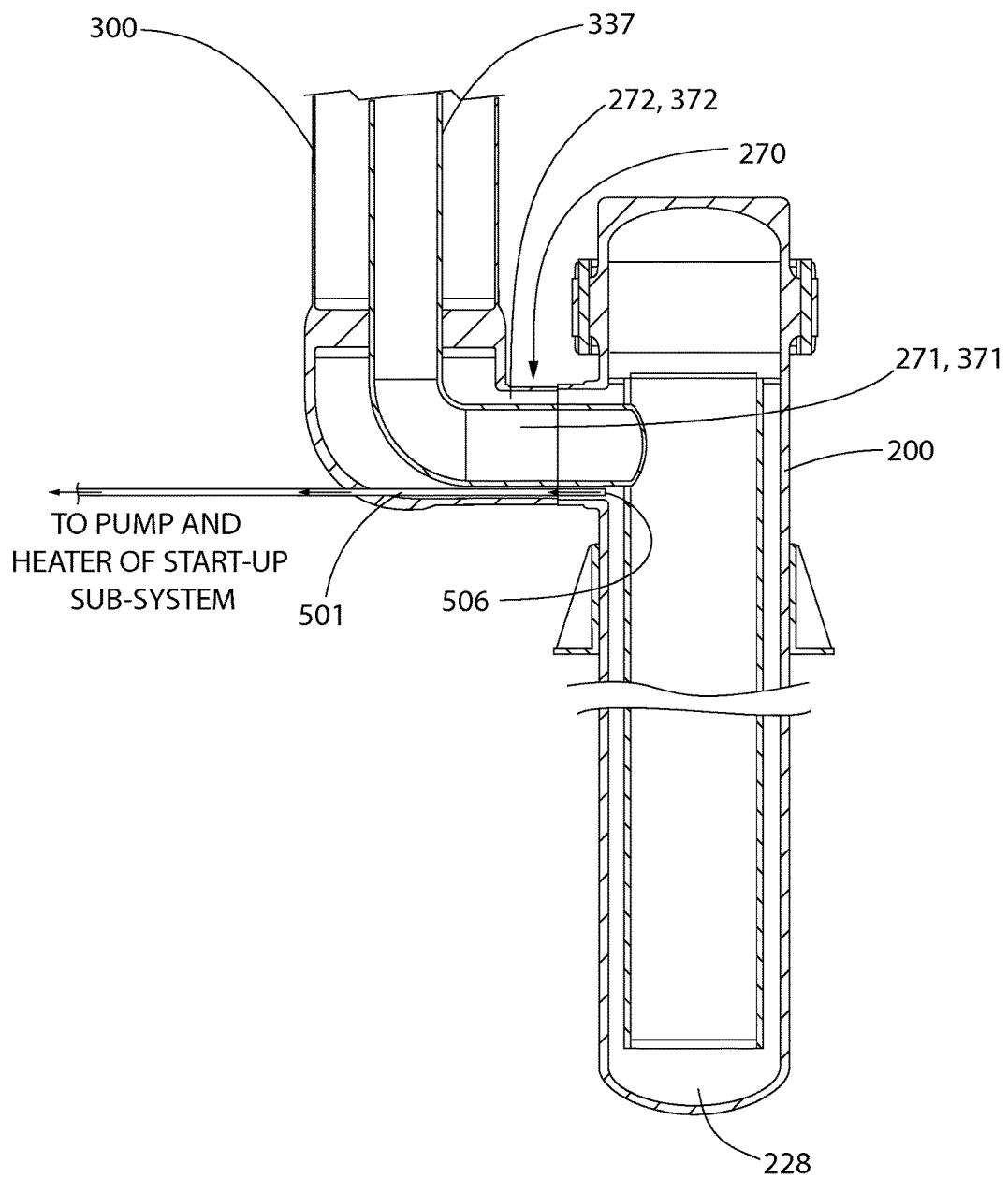
FIG. 5B is the close-up view of FIG. 5A illustrating the location of the intake conduit of the start-up sub-system in accordance with a second embodiment of the present invention.
Figure 5C:
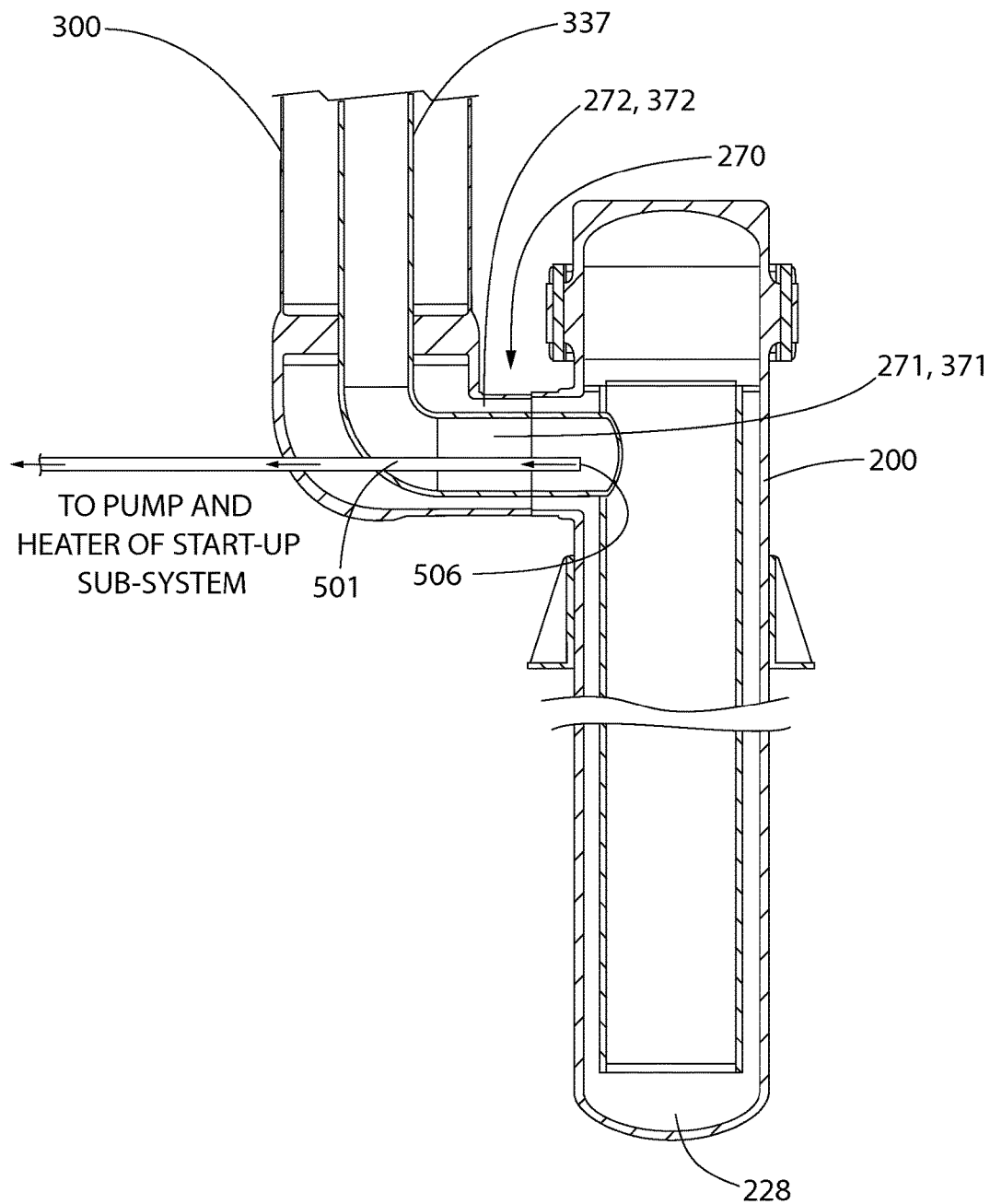
FIG. 5C is the close-up view of FIG. 5A illustrating the location of the intake conduit of the start-up sub-system in accordance with a third embodiment of the present invention.

Specifically, FIGS. 5A-5C show different places that the inlet 506 of the intake conduit 501 can be positioned in different embodiments. The positioning of the inlet 506 of the intake conduit 501 illustrated in FIGS. 5A-5C are merely exemplary and are not intended to be limiting of the present invention. Therefore, it should be understood that the inlet 506 of the intake conduit 501 can be located at any other desired location along the primary coolant loop. In FIG. 5A, the inlet 506 of the intake conduit 501 is positioned at the bottom of the reactor vessel 200. In FIG. 5B, the inlet 506 of the intake conduit 501 is positioned at the bottom of the steam generating vessel 300 or within the outer flow path 272, 372 of the fluid coupling 270 between the steam generating vessel 300 and the reactor vessel 200. In FIG. 5C, the inlet 506 of the intake conduit 501 is positioned within the riser pipe 337 or within the inner flow path 271, 371 of the fluid coupling 270 between the steam generating vessel 300 and the reactor vessel 200. The inlet 506 of the intake conduit 501 can also be positioned within the riser pipe 337 upstream of the fluid coupling 270 or at any other desired location within the primary coolant loop 190. Regardless of its exact positioning, the location of the inlet 506 of the intake conduit 501 is the location from which the portion of the primary coolant is withdrawn for introduction into the start-up sub-system 500.

In certain embodiments, the pump 502 may be fluidly coupled to more than one intake conduit or more than one inlet so that the primary coolant can be drawn from the primary coolant loop 190 and introduced into the start-up sub-system 500 from more than one location simultaneously, or so that an operator can determine the location from which the primary coolant can be taken based on desired applications and start-up time requirements. Specifically, there may be multiple intake conduits that are connected to the injection conduit such that there are valves associated within each intake conduit. One of the intake conduits can have an inlet located at a bottom of the reactor vessel 200 and another one of the intake conduits can have an inlet located at a bottom of the steam generating vessel 300. Thus, an operator can open one or more of the valves while leaving the other valves closed to determine the location(s) within the primary coolant loop 190 from which the primary coolant will be drawn for introduction into the start-up sub-system 500. The multiple intake conduits with their respective isolation or shutoff valves may be fluidly coupled to a common intake piping manifold fluidly connected to the suction of the pump 502. Such arrangements are well known to those in the art without further elaboration.

Referring back to FIG. 1, regardless of the exact positioning of the inlet 506 of the intake conduit 501, a portion of the primary coolant is drawn from the primary coolant loop 190 into the intake conduit 501 of the start-up sub-system 500 when it is desired to start the nuclear steam supply system 100. More specifically, in the exemplified embodiment the primary coolant is drawn from the primary coolant loop 190 by the operation of the pump 502. Specifically, in the exemplified embodiment when the pump 502 is turned on, the portion of the primary coolant is drawn from the primary coolant loop 190 and into the start-up sub-system 500. When the pump is turned off, none of the primary coolant is drawn from the primary coolant loop 190 and into the start-up sub-system 500.

Although the use of the pump 502 for drawing the portion of the primary coolant into the start-up sub-system 500 is described above, the invention is not to be so limited. In certain other embodiments, the start-up sub-system 500 may include a shutoff or isolation valve(s) 501A positioned at some point along the intake conduit 501. In some embodiments, the start-up sub-system 500 may also or alternatively include another shutoff or isolation valve(s) 503A positioned at some point along the injection conduit 503. The use of valves 501A, 503A enables the start-up sub-system to be cut off or isolated from the reactor vessel 200 and the steam generating vessel 300 from a fluid flow standpoint. Specifically, by closing the valves the primary coolant will be unable to enter into the start-up sub-system 500, and the primary coolant loop will form a closed-loop path. One embodiment of the use of valves in the start-up sub system 500 and the connection/placement of those valves will be described in more detail below with reference to FIG. 7.

Where valves are used, the valves can be alterable and moved between an open state whereby a portion of the primary coolant flows from the primary coolant loop and into the start-up sub-system 500, and a closed state whereby the primary coolant is prevented from flowing into the start-up sub-system 500. In some embodiments, both the pump 502 and one or more valves may be used in conjunction with one another to facilitate and regulate the amount of flow of the portion of the primary coolant bypassed into the start-up sub-system 500.

Still referring to FIG. 1, when the pump 502 is operating (and any valves positioned between the reactor vessel 200 and the start-up sub-system 500 and between the steam generating vessel 300 and the start-up sub-system 500 are open), the portion of the primary coolant flows from the primary coolant loop 190 and into the intake conduit 501 through the inlet 506. In FIG. 1, this portion of the primary coolant is taken from the bottom of the reactor vessel 200 where the primary coolant is at its coldest. However, as discussed above the primary coolant can be taken from any location along the primary coolant loop 190, including from within the steam generating vessel 300 and within the riser pipe 337. The portion of the primary coolant flows through the intake conduit 501, passes through the pump 502 and flows into the injection conduit 503 whereby the portion of the primary coolant passes through the heating element 504. As the portion of the primary coolant passes through or by the heating element 504, the portion of the primary coolant is heated and becomes a heated portion of the primary coolant. The heated portion of the primary coolant then continues to flow along the injection conduit 503 and into the injection nozzle 505 where the heated portion of the primary coolant is injected back into the primary coolant loop 190.

Figure 6:
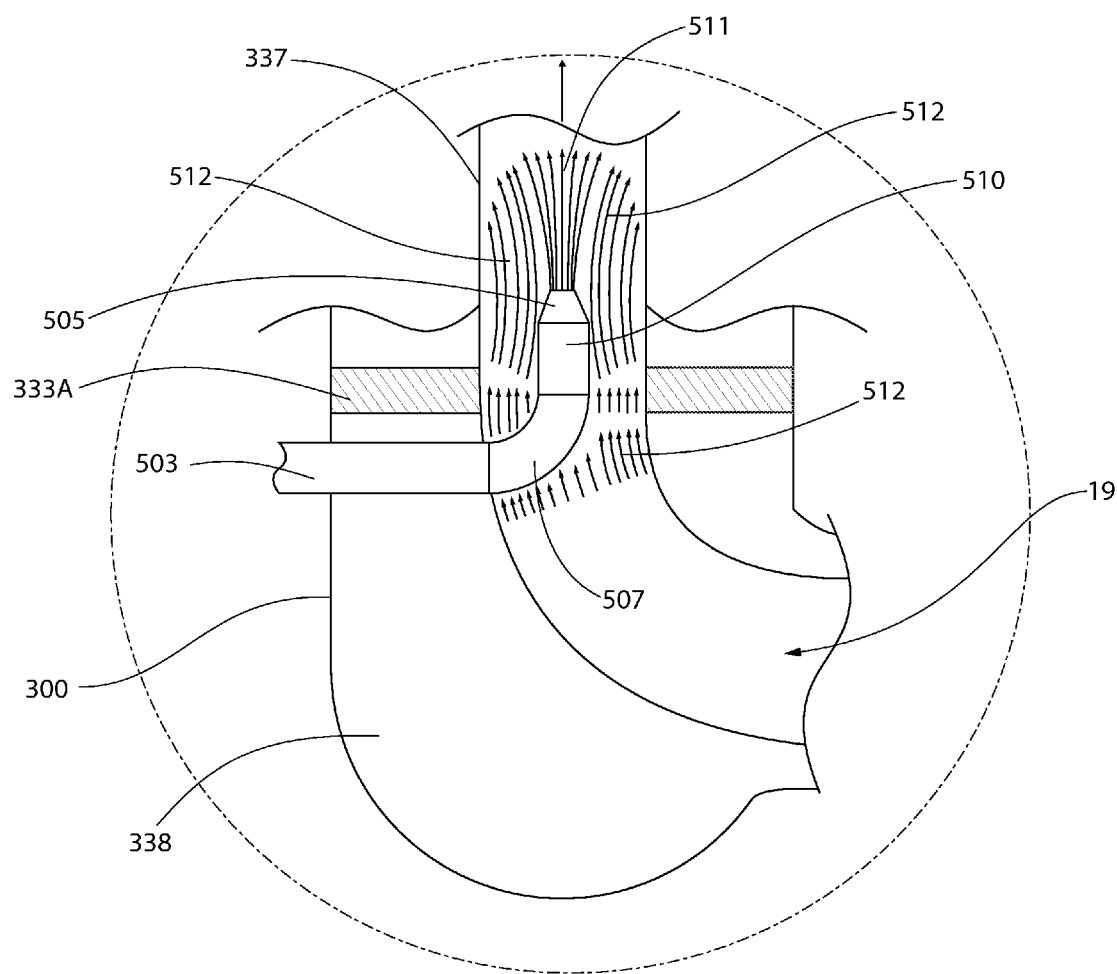
FIG. 6 is a close-up view of area VI of FIG. 1.

Referring to FIGS. 1 and 6 concurrently, the injection of the heated portion of the primary coolant into the primary coolant loop 190 will be discussed in more detail. In the exemplified embodiment, the injection nozzle 505 is positioned within the riser pipe 337 of the steam generating vessel 300. Of course, the invention is not to be so limited and the injection nozzle 505 can be positioned at other locations within either the reactor vessel 200 or the steam generating vessel 300 as desired. Specifically, the injection conduit 505 can be located within the riser column 224 of the reactor vessel 200, within the downcomer 222 of the reactor vessel 200, within the pressurizer 380 of the steam generating vessel 300 or at any other desired location.

In the exemplified embodiment the injection nozzle 505 is centrally located within the riser pipe 337 so as to be circumferentially equidistant from the inner surface of the riser pipe 337. Furthermore, the injection nozzle 505 faces in an upwards direction so that the heated portion of the primary coolant injected from the injection nozzle 505 is made to flow in a vertical upward direction. In the exemplified embodiment, the injection conduit 503 enters into the steam generating vessel 300 at the bottom-most tubesheet 333A elevation, and the injection nozzle 505 is positioned near or at the elevation of the bottom-most tubesheet 333A. More specifically, the injection conduit 503 extends horizontally into the riser 337 just below the bottom-most tubesheet 333A, an elbow connects the injection conduit 503 to the injection nozzle 505, and the injection nozzle 505 extends vertically from the elbow within the riser pipe 337. Specifically, the injection nozzle 505 in one embodiment is located so as to inject the heated portion of the primary coolant just above the bottom-most tubesheet 333A. Thus, in the exemplified embodiment the injection nozzle 505 is located at and injects the heated portion of the primary coolant to a location above the bottom plenum 338 of the steam generating vessel 300. Of course, the invention is not to be so limited in all embodiments and as discussed above the location at which the heated portion of the primary coolant is injected can be modified as desired.

In the exemplified embodiment, the injection nozzle 505 of the start-up sub-system 500 injects a heated portion of the primary coolant (indicated with arrows as 511) into the riser pipe 337 in a first vertical direction. At the time of the initial injection of the heated portion of the primary coolant 511 into the riser pipe 337, the primary coolant (indicated with arrows as 512) is positioned in the primary coolant loop 190 including within the riser pipe 337 but is static or non-moving. After the start-up sub-system 500 begins injecting the heated portion of the primary coolant 511 into the riser pipe 337 in the first vertical direction, the entire body of the primary coolant 512 within the primary coolant loop 190 begins to flow in the first vertical direction due to the venturi effect, as discussed below. In certain embodiments, once the primary coolant 512 within the primary coolant loop 190 begins to flow, it flows at a first flow rate. Furthermore, the heated portion of the primary coolant 511 is injected at a second flow rate, the second flow rate being greater than the first flow rate.

In the exemplified embodiment, the injection of the heated portion of the primary coolant 511 creates a venturi effect in the closed loop path 190, and more specifically in the riser pipe 337. Specifically, introducing a jet of high velocity heated primary coolant 511 into the riser pipe 337 creates a venturi effect in the riser pipe 337 that creates a low pressure in the vicinity of the injection nozzle 505. This in essence creates what is also referred to in the art as a Venturi or jet pump. This low pressure pulls the primary coolant 512 from the bottom of the riser pipe 337 upwardly in the direction of the flow of the heated portion of the primary coolant 511 to the top of the steam generating vessel 300 and facilitates the flow of the primary coolant through the primary coolant loop 190. Thus, the injection of the heated portion of the primary coolant 511 from the start-up sub-system 500 initiates start-up of the nuclear steam supply system 100 by facilitating the flow of the primary coolant 512 through the primary coolant loop 190. Specifically, due to the venturi effect the mixture of the heated portion of the primary coolant 511 and the primary coolant 512 flows upwardly within the riser pipe 337, and due to gravity the mixed primary coolant 511/512 flows downwardly through the tubes 332 in the steam generating vessel 300 and downwardly through the downcomer 222 in the reactor vessel 200 due to thermosiphon flow. When the heated portion of the primary coolant 511 mixes with the primary coolant 512 in the riser pipe 337, this heated mixture expands and becomes less dense and more buoyant than the cooler primary coolant below it in the primary coolant loop. Convection moves this heated liquid upwards in the primary coolant loop as it is simultaneously replaced by cooler liquid returning by gravity.

Once the primary coolant gets heated up to the no-load operating temperature, the flow of the primary coolant in the primary coolant loop 190 is continuous without the use of an external pump. The start-up sub-system 500 and the pump 502 associated therewith merely operate to heat up the temperature of the primary coolant and to begin the flow of the primary coolant in the primary coolant loop 190 and to heat up the primary coolant in the primary coolant loop 190. However, the start-up sub-system 500 can be disconnected from the primary coolant loop 190 once no-load operating temperature of the primary coolant is reached and thermo-siphon flow of the primary coolant in the primary coolant loop is achieved.

As discussed above, as the primary coolant in the primary coolant loop 190 heats up, the primary coolant expands. Thus, in certain embodiments the system 100 may be fluidly coupled to a chemical and volume control system which can remove the additional volume of the primary coolant as needed. Furthermore, such a chemical and volume control system can also remove dissolved gases in the primary coolant. Thus, the chemical and volume control system can be used to control the liquid level by draining and adding additional primary coolant into the primary coolant loop 190 as needed. In certain embodiments, the chemical and volume control system may be capable of adding and/or removing the primary coolant at a desired rate, such as at a rate of sixty gallons per minute in some embodiments. When used, the chemical and volume control system can be fluidly coupled to the nuclear steam supply system 100 at any desired location along the primary coolant loop 190.

During start-up of the nuclear steam supply system 100, the start-up sub-system 500 continues to take a portion of the primary coolant from the primary coolant loop 190, heat the portion of the primary coolant to form a heated portion of the primary coolant, and inject the heated portion of the primary coolant into the primary coolant loop 190. The flow of the heated portion of the primary coolant into the primary coolant loop 190 serves to heat up the primary coolant (which is actually a mixture of original primary coolant and the heated portion of the primary coolant) during the start-up process. Once the primary coolant in the primary coolant loop 190 reaches the no load operating temperature, the pump 502 is turned off or the start-up sub-system 500 is otherwise isolated/disconnected/valved off from the primary coolant loop 190. In certain embodiments, only after the primary coolant reaches the no load operating temperature do the control rods begin to be withdrawn.

During the start-up procedures discussed above, the secondary coolant (i.e., feedwater) continues to be circulated on the shellside 305 of the steam generating vessel 300. Thus, as the primary coolant heats up due to the start-up procedures and begins to flow through the primary coolant loop 190 including through the tubes 332 of the steam generating vessel, the secondary coolant flowing through the shellside 305 of the steam generating vessel 300 boils to produce steam. This steam is held inside of the steam generating vessel 300 until a desired pressure is reached. Once the desired pressure is reached, a steam isolation valve (i.e., a valve between the steam generating vessel 300 and the turbine 900) is opened and a portion of the steam is sent to the turbine 900 for turbine heat-up and the remainder of the steam is sent to the condenser in a bypass operation.

In certain embodiments, the steam is sent to the turbine 900 for power production only when all of the control rods are fully withdrawn and the nuclear steam supply system 100 is at full power. Furthermore, as noted above the control rods are only fully withdrawn in some embodiments after the primary coolant reaches the no-load operating temperature. Thus, in those embodiments, during the start-up process no steam is sent to the turbine 900 for power production (although it may be sent to the turbine 900 for turbine heat-up). Power production begins in such embodiments only when the start-up process is complete and the primary coolant flows through the primary coolant loop 190 passively without the operation of a pump.

In addition to heating the primary coolant within the primary coolant loop 190, the start-up sub-system 500 can also be used for draining the primary coolant from the primary coolant loop 190 if the need arises. In certain embodiments, such as the embodiment depicted in FIGS. 1 and 5A whereby the inlet 506 of the intake conduit 501 is positioned at a bottom of the reactor vessel 300, this can include draining primary coolant from the reactor vessel 200. Furthermore, the start-up supply system 500 can be used to remove debris that may accumulate at the bottom of the reactor vessel 200 or at the bottom of the steam generating vessel 300, depending on the location of the inlet 506 of the intake conduit 501.

Figure 8:
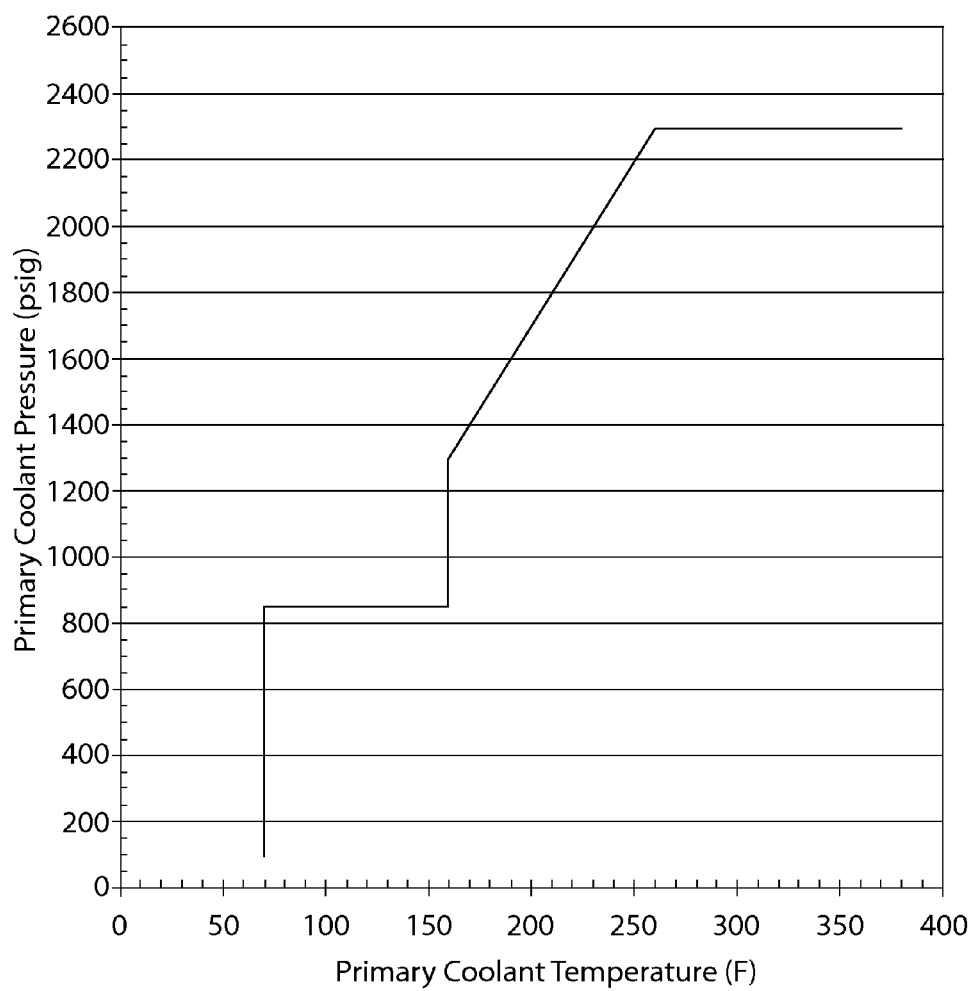
FIG. 8 is a graph illustrating the primary coolant pressure vs. the primary coolant temperature.

In certain embodiments, as the primary coolant is being heated by injecting the heated portion of the primary coolant into the primary coolant loop 190 using the start-up sub-system 500, pressure in the primary coolant loop 190 is increased in stages by introducing high pressure inert gas into the pressurizer 380 volume. The two-phase (inert gas-water vapor with liquid water) equilibrium maintains the liquid level in the pressurizer 380 volume. The staged increase in pressure follows the typical heat-up curve as shown in FIG. 8, which is based on a brittle toughness curve specific to the primary coolant loop 190, reactor vessel 200 and steam generating vessel 300 material of construction.

Figure 7:
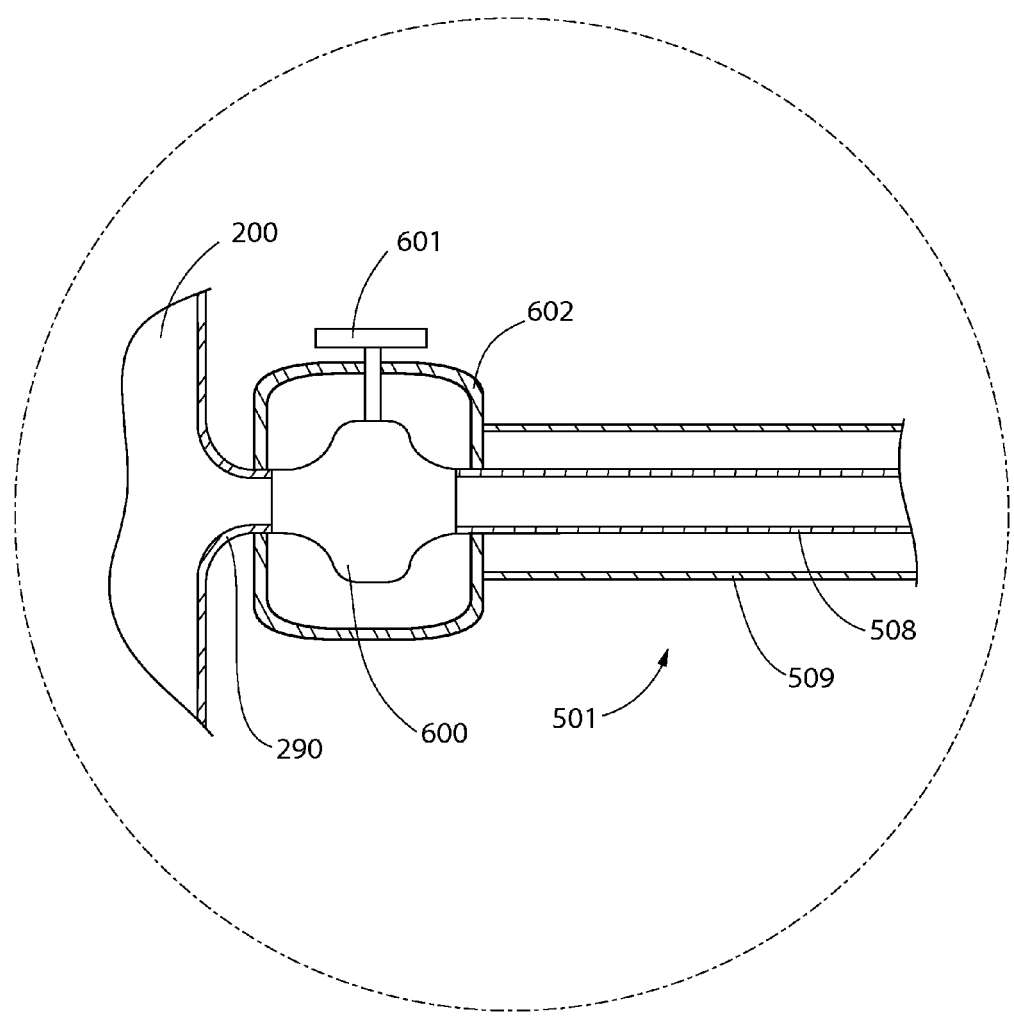
FIG. 7 is a schematic flow diagram illustrating the connection between the start-up sub-system and the reactor vessel.

Referring now to FIG. 7, the interconnection between the start-up sub-system 500 and the reactor vessel 200 will be described. Although FIG. 7 only depicts the connection between the start-up sub-system 500 and the reactor vessel 200, it should be appreciated that an identical connection can be used for connecting the start-up sub-system 500 to the steam generating vessel 300. Stated another way, FIG. 7 illustrates the manner in which the intake conduit 501 is connected to the reactor vessel 200 in a manner that prevents or eliminates or substantially reduces the likelihood of a loss-of-coolant accident. Of course, certain embodiments may omit the valves discussed below, and in certain embodiments the connection between the start-up sub-system 500 and the reactor vessel 200 and the steam generating vessel 300 may be achieved in other manners than that discussed directly below.

As illustrated in FIG. 7, the intake conduit 501 comprises a concentric pipe construction including an inner pipe 508 that carries the portion of the primary fluid from the primary coolant loop 190 and an outer pipe 509 that concentrically surrounds the inner pipe 508. The outer pipe serves as a redundant pressure boundary to contain the portion of the primary coolant within the piping in case the inner pipe 508 were to develop a leak. Two independent pressure enclosures (i.e., the inner pipe 508 and the outer pipe 509) serve to render the potential of a pipe break loss-of-coolant accident non-credible.

The inner pipe 508 is directly connected to a valve 600. Furthermore, the valve 600 is enclosed in a pressure vessel 602 which encloses the entirety of the valve 600 except for the valve stem 601. Thus, the valve stem 601 extends from the pressure vessel 602 so that manual opening and closing of the valve 600 is still possible while the pressure vessel 602 remains enclosing the valve 600. The inner pipe 509 connects to the valve 600 within the pressure vessel 602. Thus, the pressure vessel 602 prevents any loss-of-coolant accident event initiating at the weldment between the valve 600 and the inner/outer pipe 508, 509 arrangement. Specifically, if there was a breakage at the weldment between the valve 600 and the inner pipe 508, any coolant leakage would occur within the pressure vessel 602 and would not escape into the environment or elsewhere where it could cause harm.

Furthermore, the reactor vessel 200 comprises a forging 290 in the form of a piping nozzle forged integrally with the reactor vessel as shown in FIG. 7 extending from the sidewall thereof. The valve 600 is directly welded to the forging 290. This eliminates the possibility of pipe breakage between the reactor vessel 200 and the valve 600. Furthermore, the connection between the forging 290 and the valve 600 occurs within the pressure vessel 602 so that a break at the weldment between the forging 290 and the valve 600 would result in coolant leakage occurring within the pressure vessel 602.

Shutdown System for Nuclear Steam Supply System

For shutting down a typical pumped-flow pressurized water reactor in presently designed systems which include reactor coolant pumps for circulating coolant through the reactor vessel, it is necessary to cool down the primary reactor coolant from hot full power conditions to shutdown cold conditions, hereafter called Cold Shutdown Condition (CSC). The fuel core can only be accessed (by opening the reactor vessel head) to start refueling operation after reaching the Cold Shutdown Condition (CSC).

Once the reactor core has been fully shutdown by inserting all the shutdown control rods, the reactor core will begin to reject its residual decay heat to the primary coolant (which in this case will be pressurized water). Initially the primary coolant temperature in the hot leg of a traditional PWR is close to the normal operating temperature. The primary coolant has sufficient enthalpy (for the first few hours) to enable the steam generator to produce steam. The low pressure steam thus produced bypasses the turbine and is sent directly to the condenser where it is condensed and returned back to the steam generator using the feedwater pumps. In this manner, the decay heat is rejected to the ultimate heat sink (i.e. the environment) through the use of for example a cooling tower which cools the condenser or an air cooled condenser. Throughout the entire operation, the primary coolant is being circulated through the reactor pressure vessel using the reactor coolant pump.

The decay heat being produced by the shutdown reactor core will monotonically reduce and will reach a point (within the first few hours), hereafter called Intermediate Switchover Condition (ISC), where it no longer has sufficient enthalpy to enable the steam generator into producing steam. At this juncture, the primary coolant is routed through a set of heat exchangers called the Residual Heat Removal heat exchanger (RHR heat exchanger) where the primary coolant is cooled by rejecting its heat to the component cooling water supplied by the component cooling water supply system.

Once the primary coolant temperature reaches the cold shutdown condition, the reactor flange can be opened to commence the refueling operation.

According to another aspect of the invention, a nuclear steam supply shutdown system 700 is provided which functions to cool down the fuel core and dissipate residual decay heat generated by the core under steam supply shutdown conditions so that the reactor vessel may ultimately be accessed for maintenance, refueling, repairs, inspection, and/or other reasons. In various embodiments disclosed herein, this is accomplished by cooling the primary coolant and/or by cooling the secondary coolant using cooling apparatuses fluidly coupled to flow loops located externally or outside of the steam generating vessel 300 and reactor vessel 200, as further described herein.

In one embodiment, the start-up sub-system 500 may advantageously also be re-used in a modified reverse operating mode as part of the steam supply shutdown system 700 for use with the passive nuclear steam supply system 100 that normally operates via natural gravity-driven coolant circulation through the reactor. In lieu of heating the primary coolant during startup of the reactor, the start-up sub-system 500 is instead operated to remove heat from and cool the primary coolant flowing through the nuclear steam supply system 100 (i.e. reactor vessel 200 and steam generating vessel 300). As further described below, the shutdown system 700 is operable to facilitate shutdown of the reactor from a hot full power normal operating state to a cold shutdown state in a safe and controlled manner which protects the steam supply system components from damage due to the associated thermal transients experienced during reactor shutdown. The shutdown system 700 may be used of either planned or emergency reactor shutdown situations.

By definition, a passively safe nuclear steam supply system as disclosed herein does not include or require any 100% primary coolant flow pumps in the primary reactor coolant loop because the flow is driven by gravity, not mechanical pumps. In a passively cooled reactor, natural circulation flow will be sustained even after the reactor shutdown control rods are fully inserted into the core. The residual decay of the spent fuel core provides the motive force to sustain the natural circulation flow due to buoyancy effects, albeit at a reduced circulation rate.

The residual decay heat is a fraction of the full power heat decaying monotonically with time, thereby reducing the natural circulation flow rate, and taking the flow eventually into the laminar regime. This is highly undesirable as it is difficult to predict the occurrence of nucleate boiling phenomenon at the fuel cladding surface. Departure from nucleate boiling is a highly undesirable phenomenon in a PWR, which is best to be avoided to ensure operational stability and performance predictability.

Also, the cooling rate will be affected as the heat transfer coefficient is at least an order of magnitude lower in the laminar regime compared to the turbulent regime. This increases the duration to reach Cold Shutdown Conditions (CSC) delaying the refueling process. It is desirable to reach the cold shutdown condition in as short a time as possible.

The shutdown system 700 described below is uniquely designed to have a high margin of safety from the above described undesirable event and to ensure quick and safe shutdown of the reactor and steam supply system 100. The shutdown system ensures fully turbulent flow across the fuel core during the cool down process to optimize core cooling.

Figure 9:
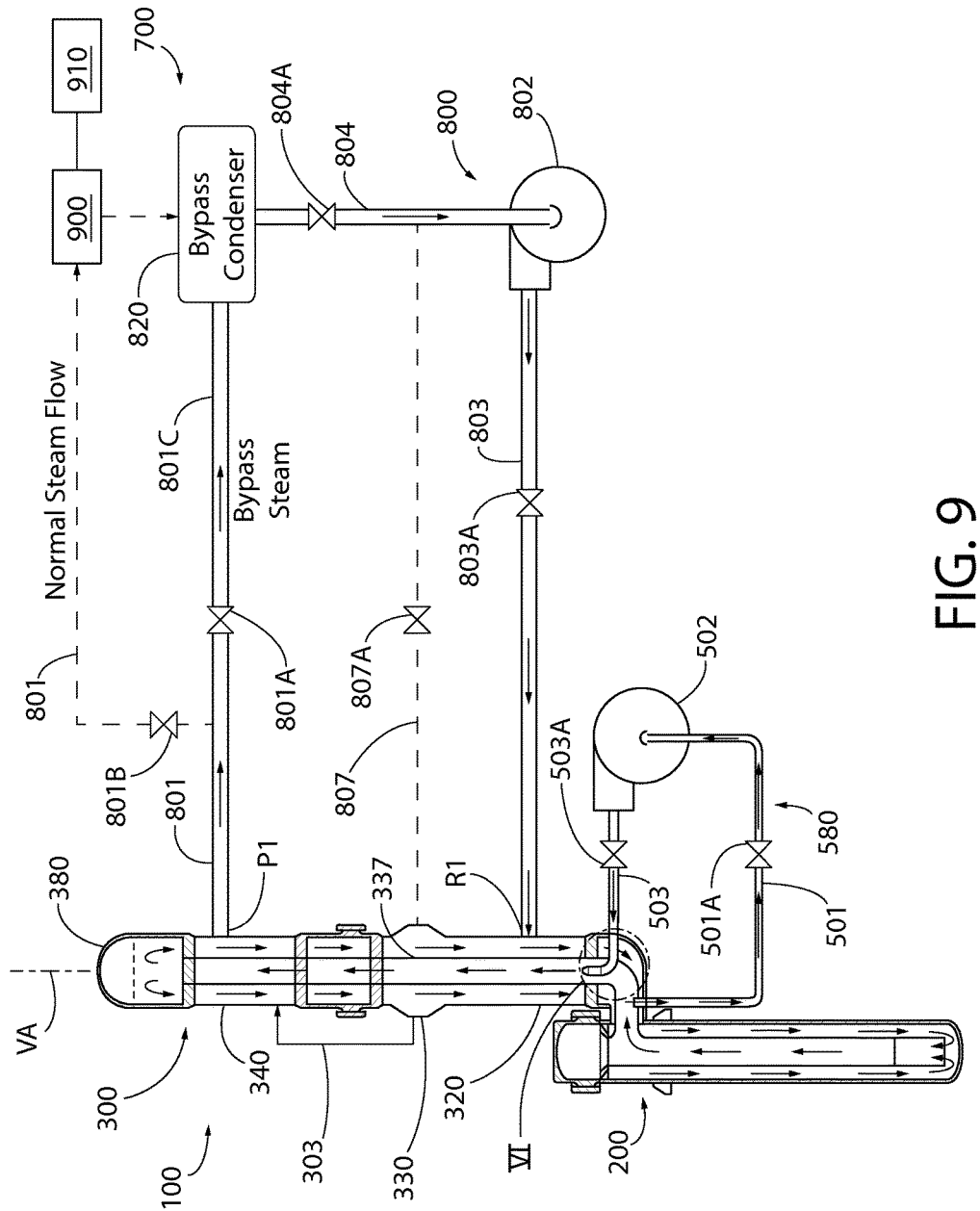
FIG. 9 is a schematic flow diagram illustrating a nuclear steam supply shutdown system in a first phase or stage of operation.
Figure 10:
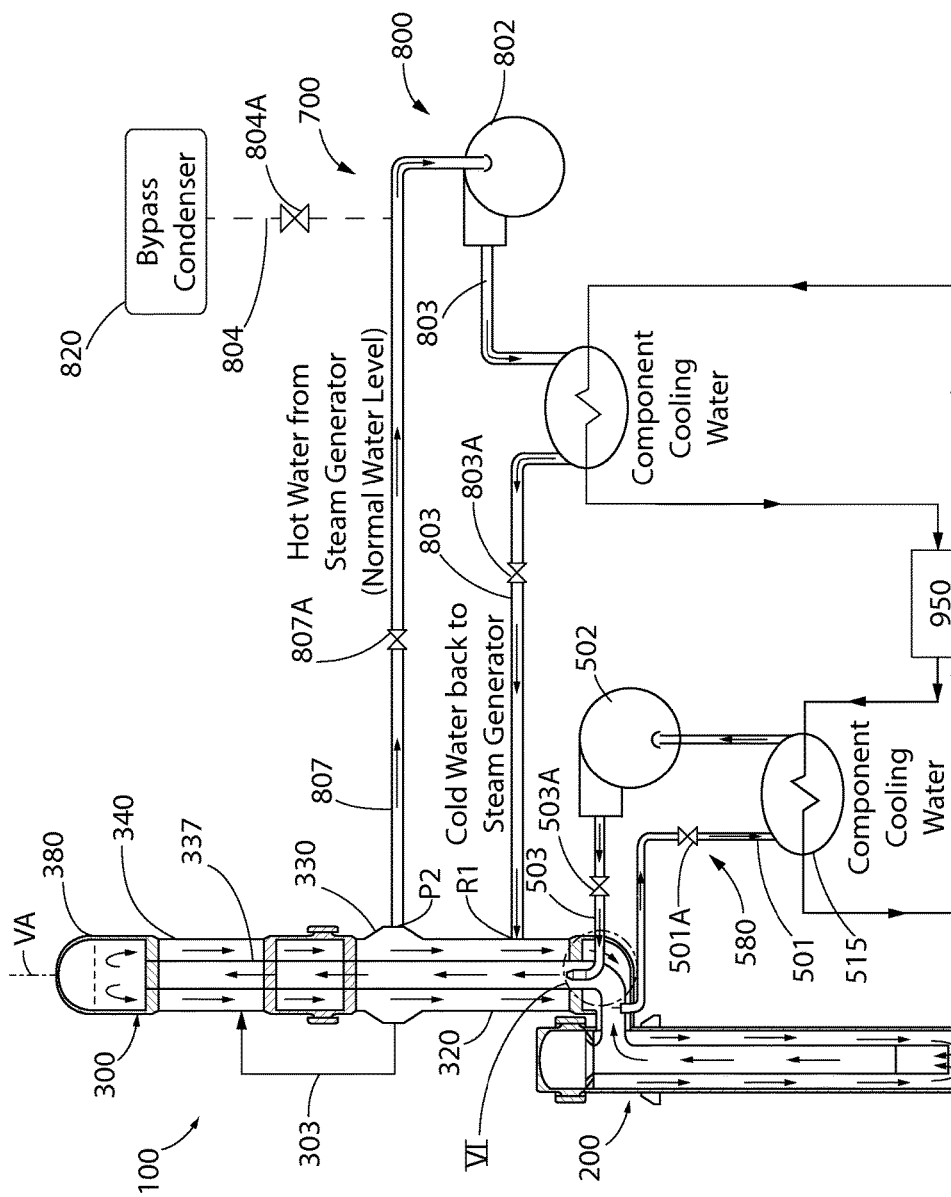
FIG. 10 is a schematic flow diagram illustrating a nuclear steam supply shutdown system in a subsequent second phase or stage of operation.

In one exemplary embodiment shown in FIGS. 9 and 10, the steam supply shutdown system 700 may generally include a primary coolant cooling system 580 configured for cooling primary coolant and a secondary coolant cooling system 800 configured for cooling the secondary coolant which normally undergoes a phase change in the steam generating vessel 300 during normal reactor operation (i.e. not shutdown or start-up) from liquid to steam to power the turbine-generator set for producing electricity. Each of the primary coolant cooling system 580 and secondary coolant cooling system 800 are comprised of separate external piping loops or circuits with pump-driven flow and coolant cooling apparatuses; the former system extracting and circulating primary coolant from the primary side (e.g. tubeside) of the steam generator 300 and the latter system extracting and circulating secondary coolant from the secondary or steam side (e.g. shell side) of the steam generator. Interconnecting piping used in each of these foregoing sub-systems may be made from nuclear industry standard piping of suitable diameter and wall thickness.

Primary Coolant Side Heat Removal

FIG. 9 is a schematic flow diagram showing an initial first operating phase of the steam supply shutdown system 700 for removing and rejecting residual decay heat from the nuclear fuel core. This situation is encountered when first shutting down the reactor, wherein the primary coolant has enough residual heat to heat the secondary coolant to a temperature sufficient to produce steam. The secondary coolant therefore is in a steam phase or state.

FIG. 10 is a schematic flow diagram showing a later second operating phase of the steam supply shutdown system 700 for removing and rejecting residual decay heat from the nuclear fuel core. This situation is encountered later in the reactor shutdown cycle, wherein the primary coolant still heats the secondary coolant but does not have enough residual heat to produce steam any longer. The secondary coolant is therefore heated by the hotter primary coolant, but remains in a liquid phase or state.

Referring generally but not exclusively to FIGS. 9 and 10, the primary coolant cooling system 580 in one embodiment may utilize and generally be comprised of the same start-up sub-system 500 (see FIG. 1) which has been slightly reconfigured for performing cooling rather than heating the cooling primary coolant during reactor shutdown. The start-up sub-system 500 may therefore be dual purposed which advantageously reduces capital equipment and maintenance costs. The primary coolant cooling system 580 therefore generally includes the same Venturi or jet pump such as Venturi injection nozzle 505 and primary coolant circulation pump 502 of the start-up sub-system 500, which operates in the same manner already described herein. To that basic system, however, the primary coolant cooling system 580 adds a cooling apparatus which in one embodiment may be a "dual purpose" primary coolant tubular heat exchanger 515 that replaces the heating element 504 of the start-up sub-system 500. A dual purpose heat exchanger 515 operates in both a user-selectable cooling mode (during shutdown) or a heating mode (during startup), as further described herein.

In other possible embodiments, it will be appreciated that completely separate primary coolant cooling system 580 and start-up sub-system 500 may be used. Accordingly, the invention is not limited to either equipment arrangement.

In one arrangement, the Venturi injection nozzle 505 as already described herein may remain located and positioned inside the straight vertical internal riser pipe 337 of steam generator 300 (see FIGS. 1, 3, 6, and 9-10). The Venturi nozzle 505 may be located near and just above the bottom end of the straight portion of riser pipe 337 so that the nozzle discharges into the riser pipe through a majority of its length.

The Venturi injection nozzle 505 is oriented to face and discharge primary coolant flow vertically and upwards through the riser pipe 337 parallel to vertical axis VA of steam generating vessel 300. The injection conduit 503 may laterally enter through the cylindrical shell 312 of steam generating vessel 300 and riser pipe 337 as best shown in FIG. 18. Preferably, in one embodiment, the injection conduit 503 enters the shell 312 of steam generating vessel 300 below the bottom tubesheet 333A so as to not interfere with the vertically straight heat exchanger tubes 332 mounted through the top surface of tubesheet.

A flow elbow 507 may be provided to change the flow direction in injection conduit 503 from horizontal to vertical. The Venturi injection nozzle 505 may be attached to the outlet of the flow elbow 507 or preferably on a short stub pipe 510 fluidly coupled to the outlet of the elbow. The latter stub piping allows the vertical position of the Venturi injection nozzle 505 to be adjusted as desired within the steam generator riser pipe 337.

As already described herein, the injection conduit 503 may be formed of heavy wall piping (e.g. 6 inches in diameter in one embodiment) that enters the riser pipe 337 at the bottom tubesheet 333A elevation) and may be then be reduced to a smaller bore nozzle 505 (e.g. 3"nozzle diameter). The heated water being pumped through the reduced bore/diameter Venturi injection nozzle 505 creates a pressurized jet stream of inlet water in the riser pipe 337 which creates the Venturi flow effect to draw primary coolant out from the reactor pressure vessel 200 into the riser pipe. The combined primary coolant flow from the Venturi nozzle discharge and primary coolant drawn upwards from the reactor vessel 200 rises together through the internal riser pipe 337 of the steam generating vessel 300 towards the pressurizer 380. The primary coolant then reverses direction and flows back down inside the tubes 332 into the reactor vessel 200, and then upwards inside riser column 224

(holding the nuclear fuel core) back to the internal riser pipe 337, as already described herein.

In one embodiment, the heating element 504 of the start-up sub-system 500 may be replaced by the dual purpose shell and tube tubular heat exchanger 515 as described above if the shutdown system 700 incorporates a modified version of start-up sub-system 500. This same heat exchanger may therefore be used for both initially heating the primary coolant during reactor start-up as already described herein in a first operating mode using a suitable steam source as the heating medium, and also conversely for removing heat from the primary coolant during reactor shutdown in a second reverse operating mode using a suitable cold water source as the cooling medium. In one embodiment, component cooling water may provide the cooling medium. This type of heat exchanger may also be referred to in the art as a "dual purpose primary heater."

During both the start-up and shutdown operation, primary coolant will flow through the tubeside (i.e. inside the tubes) in the dual purpose heat exchanger 515. However, during shutdown cooling operation as shown in FIG. 10, colder component cooling water from a component cooling water system 950 is pumped through the shellside (i.e. outside of the tubes) while allowing the hotter primary coolant to flow inside through the tubeside. The colder component cooling water cools the primary coolant flowing in the tubes of the heat exchanger 515. As described above, primary coolant is pumped through the heat exchanger 515 by the circulating water pump 502 prior to introducing the coolant back into the steam supply system 100 and reactor vessel 200 for cooling the reactor. In one embodiment, the heat exchanger 515 is disposed on the suction side of circulating water pump 502 at a suitable location in the intake conduit 501. This arrangement allows the heat exchanger tubes to have thinner wall thicknesses since the pressure of the primary coolant is lower on the suction side of the pump 502. In other possible embodiments, however, the heat exchanger 515 may be disposed on the discharge side of the circulating water pump 502 wherein thicker walled tubes would be provided for primary coolant pressure retention.

Component cooling water systems 950 are well known in the art and are pumped systems forming a continuous closed flow loop operable to circulate cooling water to a variety of plant equipment and components having cooling needs. The component cooling water extracts heat from the plant components. The heated cooling water flow is collected from multiple plant components and cooled back down in heat exchangers provided as part of the component cooling water system 950 which operate typically by either water and/or air cooling. The now cooled cooling water is then recirculated back to the plant components to repeat the cycle.

The inlet 506 of the intake piping 501 may take suction and extract primary coolant from the reactor vessel 200 or steam generating vessel 300 at any suitable location, some possible non-limiting examples of which are shown in FIGS. 5A-C and described above with respect to the start-up sub-system 500. The intake piping 501 arrangement of the start-up sub-system 500 may therefore be identical for the primary coolant cooling system 580. The location of the primary coolant extraction point selected from the reactor vessel 200 or steam generating vessel 300 will depend on a number of factors, including without limitation accessibility based on the physical layout of the steam supply system 100 equipment, thermal flow dynamics, and other considerations.

In reactor and steam supply shutdown operation, a portion of the primary coolant flowing through the reactor vessel 200 and steam generating vessel 300 is extracted or drawn into the primary coolant cooling system 580 assisted by pump 502 through the intake conduit 501. The remaining portion of the primary coolant remains in the reactor vessel 200 and steam generating vessel 300 and continues to flow through the primary coolant flow loop as described herein forming a circulation path inside the steam generating vessel and reactor vessel. In one embodiment, the amount of primary coolant extracted and circulated through the start-up sub-system 500 is less than 100% of the total volume of primary coolant present in the reactor vessel 200 and steam generating vessel 300. In some embodiments, the amount of extracted primary coolant may be less than 50%, and less than 25% of the total primary coolant volume. In one exemplary non-limiting embodiment, the extracted primary coolant may be about 10% of the total primary coolant volume stored in the reactor vessel 200 and steam generating vessel 300.

During the first initial operating phase of the steam system shutdown system 700 shown in FIG. 9 occurring right after reactor shutdown, primary coolant is extracted from the reactor vessel 200 or steam generating vessel 300 by the circulating water pump 502 and discharged through the external piping loop or circuit of the primary coolant cooling 580. The primary coolant from pump 502 is discharged directly into the riser pipe 337 without flowing through the heat exchanger 515. During this initial phase, the temperature of the primary coolant may generally be too high to utilize the heat exchanger. The secondary coolant cooling system 800 performs the function of cooling the primary coolant, as described below. At this juncture, the primary coolant cooling system 580 functions primarily to induce and drive primary coolant circulation through the primary coolant flow loop inside the reactor vessel 200 and steam generating vessel 300 under the reduced power level of the reactor fuel core 230.

During the second operating phase of the steam system shutdown system 700 shown in FIG. 10, the extracted primary coolant flows through heat exchanger 515 and is cooled in the manner already described before reaching the inlet or suction of circulating water pump 502. The pump 502 pressurizes and discharges the primary coolant through the injection conduit 503 to the Venturi injection nozzle 505 under high velocity. The pressure of the returned portion of the primary coolant is higher than the pressure of the primary coolant circulating through the reactor vessel 200 and steam generating vessel 300 in the primary coolant flow loop. It bears noting that the pump 502 therefore discharges primary coolant at a higher pressure than at the extraction pressure of the primary coolant from the primary coolant flow loop which is drawn into the intake conduit 501.

The Venturi or jet pump formed by introducing a jet of high velocity primary coolant water through Venturi injection nozzle 505 into the internal riser pipe 337 of the steam generating vessel 300 produces the motive force necessary during reactor shutdown to circulate primary coolant through the reactor vessel when insufficient heat is generated by the reactor to sustain normal gravity-driven coolant flow. The Venturi effect creates a low pressure in the vicinity of the nozzle 505 thereby pulling the water from the reactor vessel 200 into the lower portion of the internal riser pipe 337. The jet of primary coolant water injected via Venturi injection nozzle 505 mixes with the hot upwelling water from the reactor vessel 200 and is pushed upwards with the high pressure water jet to the pressurizer 380 at the very top the heat exchanger stack in the steam generating vessel 300 (reference FIGS. 1, 4, 9, and 10). The water then naturally flows downwards by gravity through the tubes 332 to the bottom of the reactor vessel completing a full cycle of primary coolant circulation. As the primary coolant flows down the heat exchanger stack tubes, the primary coolant cools down by rejecting heat across the tube walls secondary coolant. Preferably, the primary coolant flow rate is sufficient to ensure a fully turbulent flow regime across the fuel core.

As the primary coolant water cools down, it should be noted that the volume of water inventory eventually reduces and the loss may be compensated by a fresh inventory of water introduced into the primary coolant flow loop from any suitable source, such as by a chemical and volume control system in one non-limiting example.

Secondary Coolant Side Heat Removal

Referring generally but not exclusively to FIGS. 9 and 10, the secondary coolant cooling system 800 includes a secondary residual heat removal heat exchanger 810, a secondary feedwater circulation pump 802, and steam bypass condenser 820. Heat exchanger 810 may be a tubular heat exchanger including a shell and a tube bundle comprised of a plurality of tubes inside the shell, as are well known in the art. In one embodiment, the cooling water source for the heat exchanger 810 may be the plant component cooling water system 950. Secondary feedwater circulation pump 802 may be similar in type to pump 502, and in one embodiment may be a centrifugal type pump. Any suitable type pump may be used, however, for pump 802 so long as it is operable to circulate secondary coolant in a liquid state. Steam bypass condenser 820 may be any type of air or water cooled condenser operable to condense secondary coolant in a steam phase from the nuclear steam supply system 100 to liquid (variously referred to in the art as condensate or feedwater). In various embodiments, the main plant steam condenser may be used as the bypass condenser 820 or a separate condenser may be provided to serve the sole function as the bypass condenser.

Referring to FIG. 9, isolation or shutoff valves 801A and 803A may be provided respectively to isolate a steam bypass piping 801C of the secondary coolant cooling system 800 from the steam generating vessel 300 and to isolate the feedwater return piping 803 from the secondary feedwater circulation pump 802 back to the steam generating vessel. The secondary coolant cooling system 800 and associated piping loop may be sized to handle 100% of the secondary coolant flow.

During the normal generating plant and reactor power cycle operation to produce electricity,) bypass isolation valve 801A is closed and a main steam isolation/shutoff valve 801B is opened to allow superheated steam (secondary coolant) from the steam generating vessel 300 to flow to the steam turbine 900 through the main steam piping 801 as shown in FIG. 9. Steam is extracted from the superheater section 340 of the steam generator at a first extraction point P1 located at the top of the steam generating vessel 300 near and below the pressurizer 380. In this embodiment shown, the main condenser may be dual purposed and also serves as the steam bypass condenser 820. Steam (secondary coolant) flows through the steam turbine 900, is condensed by the dual purpose main/bypass condenser 820, and then is pumped back as a liquid through feedwater return piping 803 to the steam generating vessel 300 such as by secondary feedwater circulation pump 802 in one embodiment. The liquid secondary coolant may be returned to the steam generator section 330 (or preheater section 320 if provided) of the steam generating vessel 300 at a return point R1.

During reactor shutdown, the secondary coolant cooling system 800 of the shutdown system 700 may be operated in two phases to cool the hot secondary coolant; a first steam cooling phase and a subsequent second liquid cooling phase. These phases are each described in turn below.

Referring to FIG. 9, a first initial shutdown system 700 operating phase or mode (secondary coolant steam cooling phase) is shown in which the secondary coolant cooling system 800 utilizes the feedwater circulation pump 802 and steam bypass condenser 820. The secondary residual heat removal heat exchanger 810 is not used in this initial steam cooling mode.

During the first few hours following a reactor shutdown, the primary coolant cooling system 580 using the jet pump provided by Venturi nozzle 505 is operated as described above to continue to circulate primary coolant through the reactor vessel 200 and steam generating vessel 300 as described above and shown in FIG. 9. The dual purpose heat exchanger 515 is bypassed and not operated in one embodiment during this initial shutdown system 700 operating mode. There is still sufficient decay heat being rejected to the primary coolant by the nuclear fuel core 230 in this first shutdown system operating mode to coerce the steam generator to convert the secondary coolant into steam. Accordingly, this residual heat picked up by the secondary coolant in the steam generating vessel 300 must continue to be cooled absent normal operation of the steam turbine 900 which is not run during reactor shutdown.

To accomplish the foregoing cooling, in one embodiment the main steam isolation valve 801B is closed and bypass isolation valve 801A is opened to divert the steam flow (secondary coolant) through the steam bypass piping 801C of the secondary coolant cooling system 800 directly to the bypass condenser 820, thereby bypassing the steam turbine 900 (reference FIG. 9). Steam continues to be extracted from the superheater section 340 at a first extraction point P1 located at the top of the steam generating vessel 300 near and below the pressurizer 380. This is the same steam extraction point P1 used during normal plant power cycle and turbine operation discussed above. The steam is condensed and cooled in the bypass condenser 820, and the collected water condensate flows through suction piping 804 to the inlet of the secondary feedwater circulation pump 802. Pump 802 pressurizes the condensate (liquid secondary coolant) which is pumped back to the steam generator vessel 300 through feedwater return piping 803 forming a continuous closed circulation flow loop (external to the reactor and steam generating vessels 200, 300) which cools and gradually reduces the temperature of the primary coolant. This also replenishes the lost inventory of secondary coolant water in the steam generating vessel 300 and cools the secondary coolant to remove the residual heat transferred by the reactor fuel core 230 to the primary coolant, which in turn is transferred to the secondary coolant in the steam generator. Accordingly, the secondary coolant ultimately extracts and rejects residual heat from the reactor core in conjunction with operating the primary coolant shutdown system 580 in the manner described above. The cooled liquid phase secondary coolant is returned at return point R1 to the steam generating section 330 or preheater section 320 if provided.

After the first few hours when the Intermediate Switchover Condition (ISC) is reached, the decay heat from the reactor fuel core 230 is no longer sufficient to convert the secondary coolant into steam in the steam generating vessel 300. Referring to FIG. 10, the secondary coolant water remains in liquid phase and reaches a normal water level in the steam generating vessel 330 near the top of the intermediate steam generator section 330, which may be diametrically enlarged in some embodiments. Further cooling of the liquid secondary coolant is still required using the secondary residual heat removal heat exchanger 810 in lieu of the bypass condenser 820 to reach temperature conditions in the reactor suitable for a full shutdown.

Referring now to FIG. 10, a second shutdown system 700 operating phase or mode (secondary coolant liquid cooling phase) is initiated to further cool the secondary coolant to a level commensurate with final reactor shutdown conditions (i.e. primary coolant reaches the cold shutdown condition). A new secondary coolant extraction point P2 near the top of the steam generating section 330 of the steam generating vessel 300 is used to capture the heated secondary coolant flowing upwards through the shell side of the vessel which is still being heated by the residual heat in the primary coolant. Extracted hot secondary coolant (liquid phase) flows through secondary coolant suction conduit 807 and an open isolation valve 807A directly into the inlet of secondary feedwater circulation pump 802. It should be noted that the pump inlet source from the bypass condenser 820 via suction piping 804 is not used in this present secondary coolant cooling phase and may be isolated by closing isolation valve 804A. The hot liquid secondary coolant (water) is discharged from pump 802 and flows through feedwater return piping 803 to secondary residual heat removal heat exchanger 810. Heat exchanger 810 cools the hot secondary water by rejecting its heat to the component cooling water supplied by the component cooling water system 950 as already described herein. The now cold secondary coolant flows through the remainder of feedwater return piping 803 to return point R1 in the steam generator vessel 300. The foregoing secondary coolant circulation flow loop is continued until the reactor has been cooled sufficiently for complete shutdown.

Figure 11:
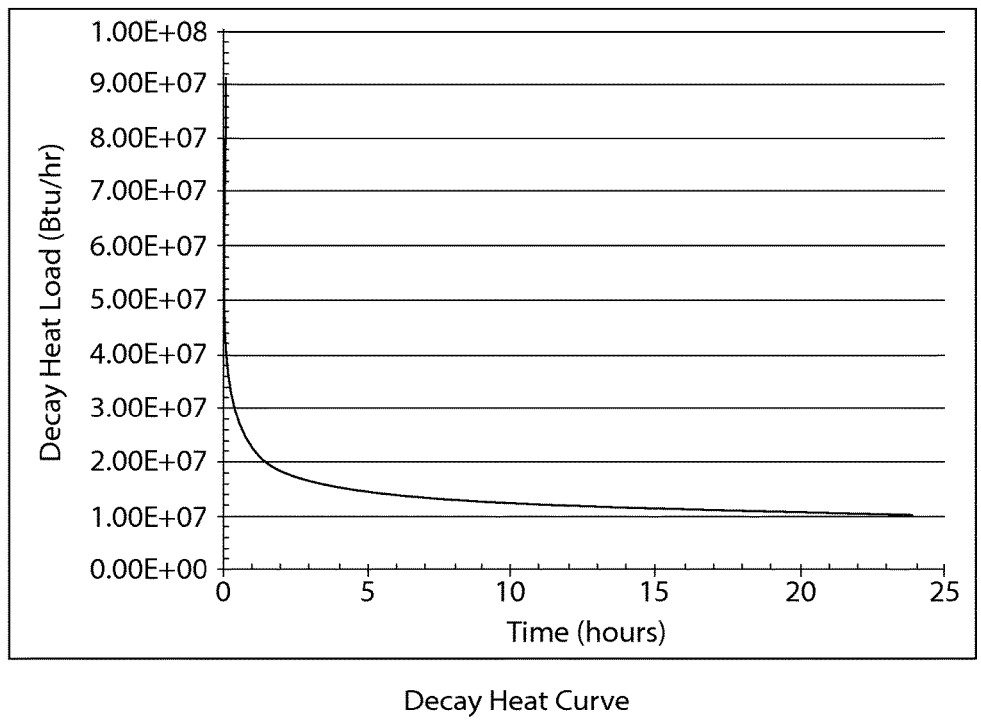
FIG. 11 is a graph illustrating the decay heat load versus time of a shutdown reactor core.

FIG. 11 is a graph showing an exemplary decay heat curve for reactor core 230 of the nuclear steam supply system 100. In this non-limiting example, core decay heat may reach minimum levels within approximately 24 hours which may be compensated for by using the steam supply shutdown system 700 described herein.

The shutdown system 700 may be configured to minimize or eliminate exposure to a Loss-of-Coolant Accident (LOCA) in this system. Referring to FIG. 7, the interconnecting piping may be made of a double wall construction. This pipe arrangement consists of a two-concentric-pipe construction with the inner pipe carrying the fluid while the outer one serves as a redundant pressure boundary to contain the fluid within the piping in case the inner pipe were to develop a leak. Two independent pressure enclosures, thus designed, serve to render the potential of a pipe-break LOCA non-credible. All isolation valves may be directly welded to the vessel nozzle forgings (see, e.g. FIG. 7) minimizing the possibility of pipe breakage between the pressure vessel and the valve. The isolation valves themselves may be enclosed in a small removable pressure vessel (called a stuffing box) as shown which encloses the entirety of the valve except for the sealed valve stem. This contains and prevents any LOCA event initiating at the weldment between valve and steam generator vessel and/or double walled piping.

The shutdown system 700 may further be configured to provide filtration. In the intake conduit 501 arrangement of the primary coolant cooling system 580 (start-up sub-system 500) shown in FIG. 5A, the intake piping reaches all the way to the bottom of the reactor vessel 200 bottom head and may be used as a siphon for debris removal. The debris, if any, generally consists of corrosion products and it is known from reactor operating experience that all debris tends to accumulate at the bottom head of the reactor pressure vessel. When the primary coolant reaches a few degrees below maximum operating temperature of the filtration system during steam system shutdown, the filtration is turned on and the circulating pump 502 will draw and extract the debris through the intake piping 501 which may include a filtration system disposed upstream of the circulating pump 502. The temperature is set by the maximum operating temperature of the filtration system. The filtration system may comprise a set of mechanical filters and a demineralizer. However, the debris could be radiologically active due to long periods of residence near the fuel core. Therefore the filtration system may be located in a heavily shielded part of the reactor containment.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed:

1. A nuclear steam supply system with shutdown cooling system, the nuclear steam supply system comprising:
   a reactor vessel having an internal cavity;
   a reactor core comprising nuclear fuel disposed within the internal cavity and operable to heat a primary coolant;
   a steam generating vessel fluidly coupled to the reactor vessel;
   a riser pipe positioned within the steam generating vessel and fluidly coupled to the reactor vessel;
   a primary coolant loop formed within the reactor vessel and the steam generating vessel, the primary coolant loop being configured for circulating primary coolant through the reactor vessel and steam generating vessel; and
   a primary coolant cooling system comprising:
      an intake conduit having an inlet fluidly coupled to the primary coolant loop;
      a pump fluidly coupled to the intake conduit, the pump configured and operable to extract and pressurize primary coolant from the primary coolant loop and discharge the pressurized primary coolant through an injection conduit;
      a Venturi injection nozzle having an inlet fluidly coupled to the injection conduit and an outlet positioned within the riser pipe to inject pressurized primary coolant into the riser pipe from the pump; and
      a heat exchanger configured and operable to cool the extracted primary coolant.

2. The nuclear steam supply system according to claim 1, wherein the inlet of the intake conduit is located at a bottom of the reactor vessel.

3. The nuclear steam supply system according claim 1, wherein the inlet of the intake conduit is located at a bottom of the steam generating vessel.

4. The nuclear steam supply system according to claim 1, wherein the inlet of the intake conduit is located at a bottom of the riser pipe.

5. The nuclear steam supply system according to claim 1, wherein the steam generating vessel comprises a steam generating section and a superheater section disposed above the steam generating section in vertically stacked relationship, the superheater section being operable to heat a secondary coolant to superheated steam conditions.

6. The nuclear steam supply system according to claim 5, further comprising:
the steam generating section and the superheater section including a pair of vertically spaced apart tubesheets and a tube bundle comprising a plurality of vertically-oriented tubes extending between the tubesheets; and
wherein the injection nozzle is positioned so as to inject the pressurized primary coolant into the riser pipe of the steam generating section at or near an elevation of a bottom one of the tubesheets.

7. The nuclear steam supply system according to claim 1, wherein the injection conduit is a pipe having a diameter of approximately 6 inches and wherein the injection nozzle has a diameter of approximately 3 inches.

8. The nuclear steam supply system according to claim 1, wherein injecting the pressurized primary coolant into the riser pipe through the injection nozzle creates a low pressure Venturi effect that causes the primary coolant to flow through the primary coolant loop.

9. The nuclear steam supply system according to claim 1, further comprising:
the steam generating vessel including a plurality of stacked heat exchangers fluidly connected in a vertically stacked relationship;
the stacked heat exchangers each including a pair of vertically spaced apart tubesheets and a tube bundle comprising a plurality of vertically oriented tubes extending between the tubesheets;
wherein upon injecting the pressurized primary coolant into the riser pipe, the primary coolant flows vertically upwards through the riser pipe to a top of the steam generating vessel, vertically downwards from the top of the steam generating vessel through the tubes of the stacked heat exchangers, vertically downwards through a downcomer in the reactor vessel to the bottom of the reactor vessel, vertically upwards within a riser column in the reactor vessel, and from the riser column in the reactor vessel back into the riser pipe in the steam generating vessel; and
wherein a secondary coolant flows upwards between the tubes on a shell side of each of the stacked heat exchangers.

10. The nuclear steam supply system according to claim 1, wherein the reactor vessel, the steam generating vessel, and the primary coolant cooling system are positioned within a containment vessel.

11. The nuclear steam supply system according to claim 1, wherein at least a portion of the primary coolant cooling system is positioned external to the reactor vessel and the steam generating vessel.

12. The nuclear steam supply system according to claim 1, wherein the primary coolant cooling system is a one-way fluid flow circuit in which the primary coolant flows from the primary coolant loop through the intake conduit, through the pump, into the injection conduit, through the heat exchanger, further through the injection conduit, and into the riser pipe of the steam generating vessel via the injection nozzle.

13. The nuclear steam supply system according to claim 1, wherein the primary coolant cooling system further comprises a valve that is welded at one end to a forging in the form of an integral piping nozzle of the reactor vessel and at another end to an inner pipe fluidly coupled to the valve and arranged inside an outer pipe that concentrically surrounds the inner pipe, the inner and outer pipes collectively forming the intake conduit.

14. The nuclear steam supply system according to claim 13, further comprising a pressure vessel enclosing the valve, a valve stem of the valve protruding from the pressure vessel, and wherein a connection between the inner pipe and the valve and a connection between the valve and the integral piping nozzle of the reactor vessel are located within the pressure vessel.

15. The nuclear steam supply system according to claim 1, wherein the primary coolant cooling system extracts a portion of the total volume of the primary coolant from the primary coolant loop, the remainder of the primary coolant remaining in the primary coolant loop.

16. The nuclear steam supply system according to claim 1, wherein the pressurized primary coolant from the injection nozzle mixes with the primary coolant drawn into the riser pipe from the reactor vessel by a Venturi flow effect to form a mixed primary coolant flow through the riser pipe.

17. The nuclear steam supply system according claim 1, wherein the primary coolant is cooled in the heat exchanger by water from a component cooling system.

18. The nuclear steam supply system according to claim 1, wherein the heat exchanger is a shell and tube type.

19. A nuclear steam supply system with shutdown cooling system, the nuclear steam supply system comprising:
a reactor vessel having an internal cavity;
a reactor core comprising nuclear fuel disposed within the internal cavity and operable to heat a primary coolant;
a steam generating vessel fluidly coupled to the reactor vessel and containing a secondary coolant for producing steam to operate a steam turbine, the steam generating vessel including a superheater section and a steam generator section;
a riser pipe positioned inside the steam generating vessel and fluidly coupled to the reactor vessel;
a primary coolant flow loop formed within the reactor vessel and the steam generating vessel, the primary coolant flow loop being configured and operable for circulating primary coolant through the reactor vessel and steam generating vessel;
a primary coolant cooling system comprising:
a first pump having an inlet fluidly coupled to the primary coolant flow loop, the first pump configured and operable to extract and pressurize a portion of the primary coolant from the primary coolant loop;
a Venturi injection nozzle having an inlet fluidly coupled to a discharge of the first pump and an outlet positioned inside the riser pipe in the steam generating vessel, the injection nozzle receiving and injecting the pressurized portion of the primary coolant into the riser pipe from the pump; and
a first heat exchanger configured and operable to cool the extracted primary coolant prior to injecting the pressurized portion of the primary coolant;

a secondary coolant cooling system comprising:
- a steam bypass condenser having an inlet fluidly coupled to the superheater section of the steam generator vessel for receiving and cooling secondary coolant in a steam phase;
- a second heat exchanger having an inlet fluidly coupled to the steam generator section of the steam generating vessel for receiving and cooling secondary coolant in a liquid phase;
- a second pump having an inlet fluidly coupled to the steam bypass condenser and the second heat exchanger, the second pump configured and operable to pressurize and circulate secondary coolant through the steam generator in a secondary coolant flow loop;
- wherein the secondary coolant cooling system is configured to cool secondary coolant in either the steam or liquid phase.

20. The nuclear steam supply system according to claim 19, wherein the second heat exchanger is disposed in the secondary coolant flow loop between a discharge outlet of the second pump and the steam generating vessel.

21. The nuclear steam supply system according to claim 19, wherein the second heat exchanger is disposed in the secondary coolant flow loop between the inlet of the second pump and the steam generating vessel.

22. The nuclear steam supply system according to claim 19, wherein the steam bypass condenser is disposed in the secondary coolant flow loop between the second pump and the steam generating vessel.

23. The nuclear steam supply system according to claim 19, wherein the secondary coolant flow loop is external to the steam generating vessel.

24. The nuclear steam supply system according to claim 19, wherein the steam generating vessel and reactor vessel are vertically elongated.

25. The nuclear steam supply system according to claim 24, wherein the superheater section and steam generating section of steam generating vessel are disposed in vertically stacked relationship.

26. The nuclear steam supply system according to claim 25, wherein the superheater section is positioned above the steam generating section.

27. The nuclear steam supply system according to claim 19, wherein the portion of the primary coolant extracted by the pump is less than 50% of the total volume of primary coolant contained in the primary coolant flow loop.

28. The nuclear steam supply system according to claim 19, wherein the portion of the primary coolant extracted by the pump is about 10% of the total volume of primary coolant contained in the primary coolant flow loop.

29. A nuclear steam supply system with shutdown cooling system, the nuclear steam supply system comprising:
- a reactor vessel having an internal cavity;
- a vertically elongated reactor core comprising nuclear fuel disposed within the internal cavity and operable to heat a primary coolant;
- a vertically elongated steam generating vessel fluidly coupled to the reactor vessel and containing a secondary coolant for producing steam to operate a steam turbine, the steam generating vessel including a superheater section and a steam generator section;
- a vertically elongated riser pipe positioned inside the steam generating vessel and fluidly coupled to the reactor vessel;
- a primary coolant flow loop formed within the reactor vessel and the steam generating vessel, the primary coolant flow loop being configured and operable for circulating primary coolant through the reactor vessel and steam generating vessel;
- a secondary coolant flow loop formed outside of the reactor vessel and steam generating vessel, the secondary coolant flow loop being configured and operable for circulating secondary coolant through the steam generating vessel; and
- a Venturi jet pump disposed inside the riser pipe of the steam generating vessel, the jet pump including an injection nozzle fluidly coupled to the primary coolant flow loop by a pump fluidly coupled to the primary coolant flow loop which extracts and pressurizes the portion of the primary coolant from the primary coolant flow loop and discharges the pressurized portion of the primary coolant to the injection nozzle;
- wherein the jet pump receives and injects a portion of the primary coolant into the riser pipe which draws and mixes primary coolant from the reactor vessel with the injected portion of the primary coolant in the jet pump to circulate primary coolant through the primary coolant flow loop.

30. The nuclear steam supply system according to claim 29, further comprising a first heat exchanger disposed upstream of the jet pump and configured to cool the portion of the primary coolant received by the jet pump before injection into the riser pipe.

31. The nuclear steam supply system according to claim 29, wherein the injection nozzle discharges primary coolant in an upwards directions inside the riser pipe.

32. The nuclear steam supply system according to claim 29, further comprising a second pump fluidly coupled to the secondary coolant flow loop which receives secondary coolant extracted at a first elevation from the steam generating vessel, pressurizes the secondary coolant, and returns the pressurized secondary coolant at a second elevation to the steam generating vessel which is different than the first elevation.

33. The nuclear steam supply system according to claim 32, further comprising:
- a bypass condenser fluidly coupled to the secondary coolant flow loop, the bypass condenser configured to receive and condense secondary coolant in a steam phase extracted from the superheater section of the steam generating vessel;
- wherein the second pump takes suction from and receives liquid phase secondary coolant from the bypass condenser.

34. The nuclear steam supply system according to claim 32, further comprising:
- a heat exchanger fluidly coupled to the secondary coolant flow loop, the heat exchanger configured to receive secondary coolant in a liquid phase extracted from the steam generating section of the steam generating vessel;
- wherein the second pump takes suction from and receives liquid phase secondary coolant from the heat exchanger.

35. The nuclear steam supply system according to claim 32, wherein the superheater section is vertically stacked above the steam generating section in the steam generating vessel.

* * * * *